United States Patent
Bergmann et al.

(10) Patent No.: US 11,686,390 B2
(45) Date of Patent: Jun. 27, 2023

(54) TURBOEXPANDER LABYRINTH SEAL

(71) Applicant: ACD, LLC, Santa Ana, CA (US)

(72) Inventors: Duane Bergmann, Big Bear Lake, CA (US); John Park, Irvine, CA (US); Asit Singhal, Lake Forest, CA (US); Geoff Legg, Huntington Beach, CA (US)

(73) Assignee: ACD, LLC, Santa Ana, CA (US)

( * ) Notice: Subject to any disclaimer, the term of this patent is extended or adjusted under 35 U.S.C. 154(b) by 706 days.

(21) Appl. No.: 16/725,815

(22) Filed: Dec. 23, 2019

(65) Prior Publication Data

US 2020/0200273 A1 Jun. 25, 2020

Related U.S. Application Data

(60) Provisional application No. 62/783,536, filed on Dec. 21, 2018.

(51) Int. Cl.
  F16J 15/16 (2006.01)
  F01D 11/02 (2006.01)

(52) U.S. Cl.
  CPC .......... F16J 15/164 (2013.01); F01D 11/02 (2013.01)

(58) Field of Classification Search
  CPC ...... F16J 15/164; F16J 15/447; F16J 15/4472; F16J 15/4474; F16J 15/4476; F16J 15/4478; F01D 11/02
  See application file for complete search history.

(56) References Cited

U.S. PATENT DOCUMENTS

| | | | |
|---|---|---|---|
| 969,869 A * | 9/1910 | Hodgkinson | F16J 15/164 277/377 |
| 3,594,094 A | 7/1971 | Engelke et al. | |
| 3,976,395 A | 8/1976 | Kalnin et al. | |
| 4,287,758 A | 9/1981 | Swearingen | |
| 4,472,107 A | 9/1984 | Chang | |
| 5,024,451 A | 6/1991 | Borowski | |
| 5,104,284 A | 4/1992 | Hustak, Jr | |
| 5,344,160 A | 9/1994 | Scarlata et al. | |
| 5,454,689 A * | 10/1995 | Falavigna | F01D 11/04 415/230 |
| 6,000,701 A | 12/1999 | Burgess | |
| 6,582,185 B2 | 6/2003 | Lippert et al. | |
| 2006/0151958 A1* | 7/2006 | Chevrette | F16J 15/442 277/411 |
| 2014/0294563 A1 | 10/2014 | Sgamgati et al. | |

OTHER PUBLICATIONS

USPTO/ISA, International Search Report and Written Opinion for PCT Application No. PCT/US2019/068402, dated Mar. 11, 2020.
Jumonville, Jigger, "Tutorial on Cryogenic Turboexpanders." Proceedings of the Thirty-Ninth Turbomachinery Symposium (2010). pp. 147-154.
ACD LLC, "Turbo Expander Compressor (TC) Series." Bulletin No. ACD Turbo TC 2010. 2 pages.
Westermann, P. "Turbo Expanders: Dwelling on Efficiency." ACD, LLC (2010) 2 pages.

* cited by examiner

Primary Examiner — Eugene G Byrd
Assistant Examiner — L. Susmitha Koneru
(74) Attorney, Agent, or Firm — SoCal IP Law Group LLP; Guy Cumberbatch

(57) ABSTRACT

There is disclosed a labyrinth seal arrangement for gas turboexpanders and the like which reduces process gas losses. The labyrinth seal includes a plurality of axially spaced seal sets with teeth facing a seal member. A plurality of vent ports in between each seal set permits extraction of gradually lower pressure process gas.

15 Claims, 19 Drawing Sheets

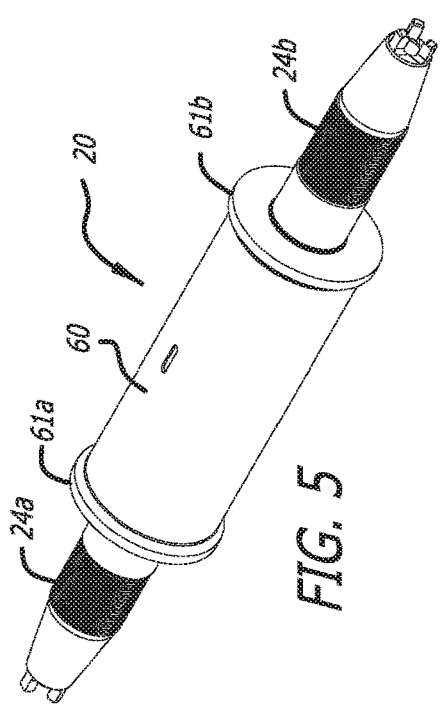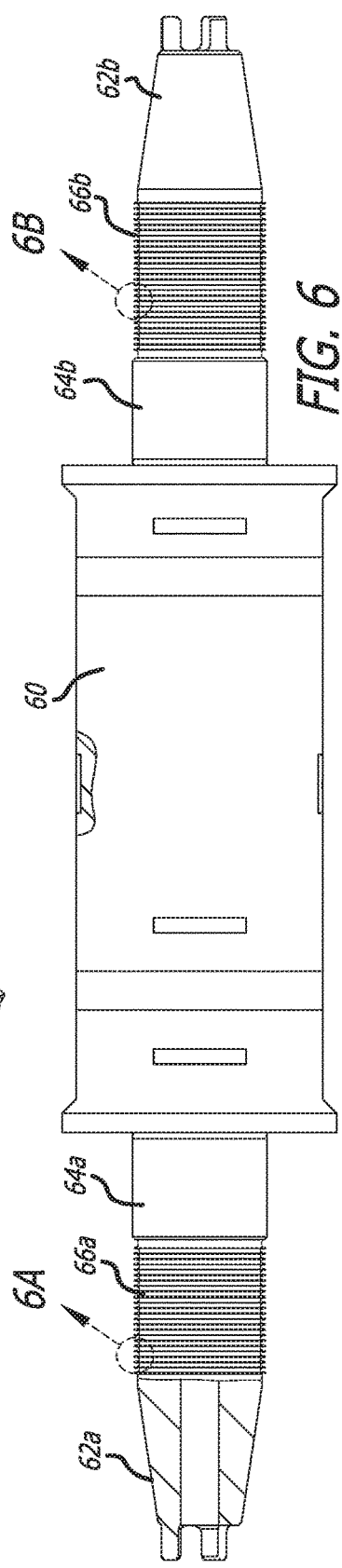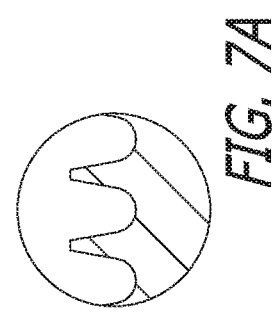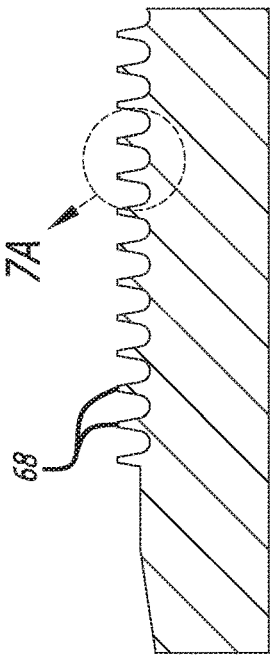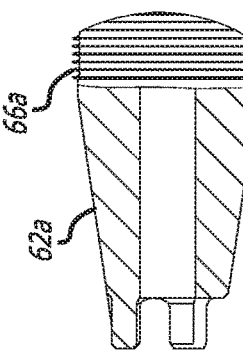

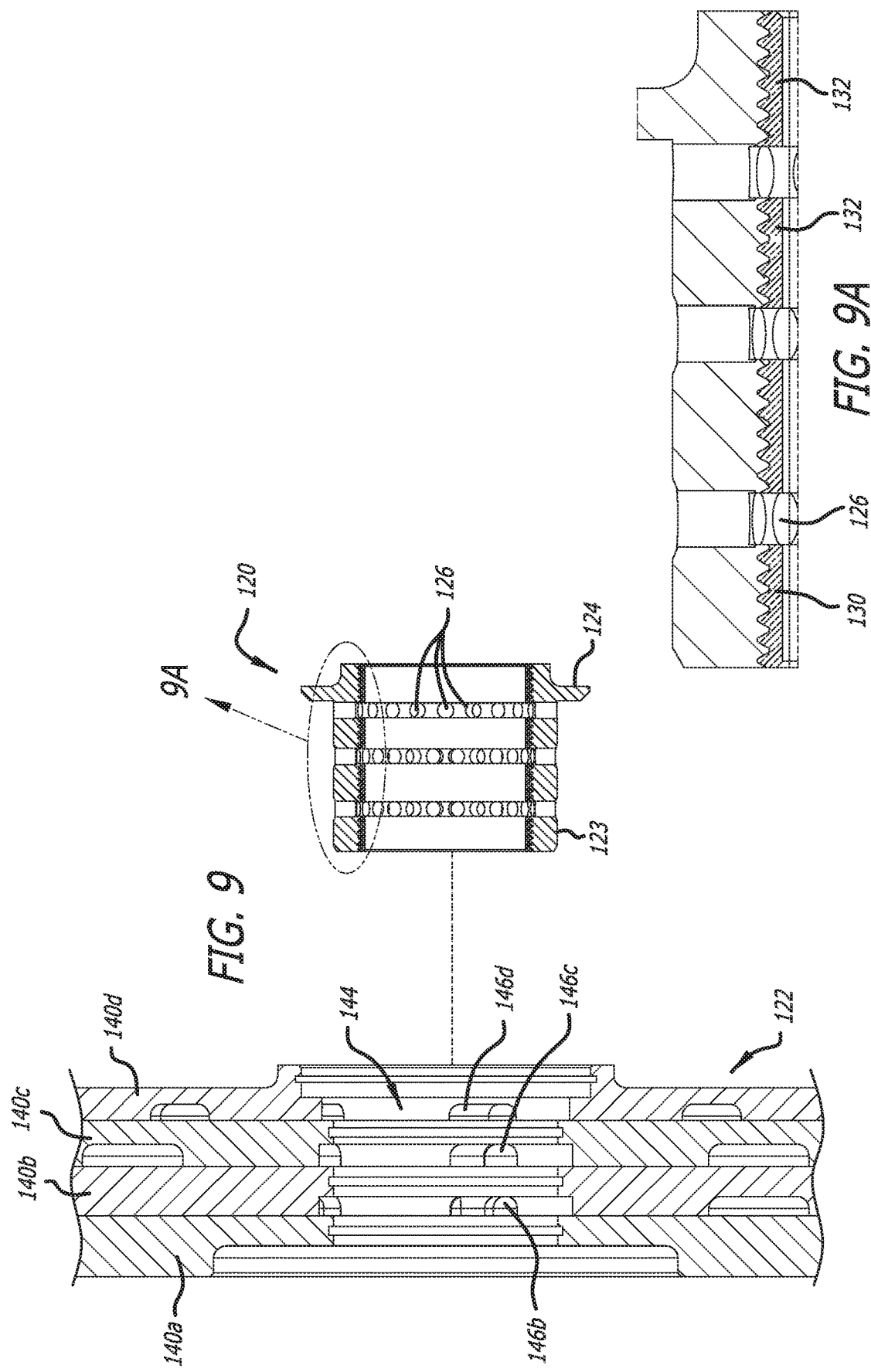

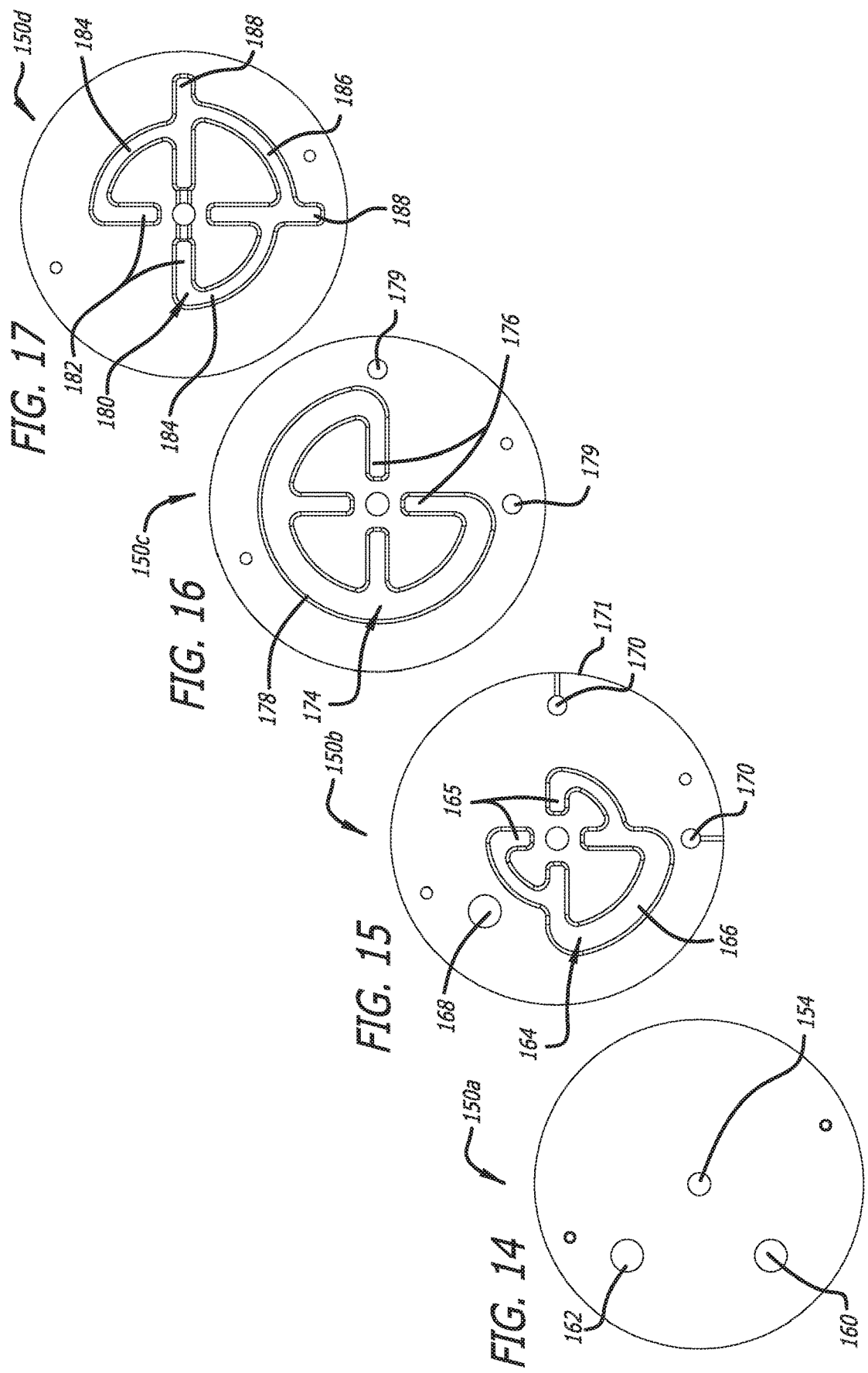

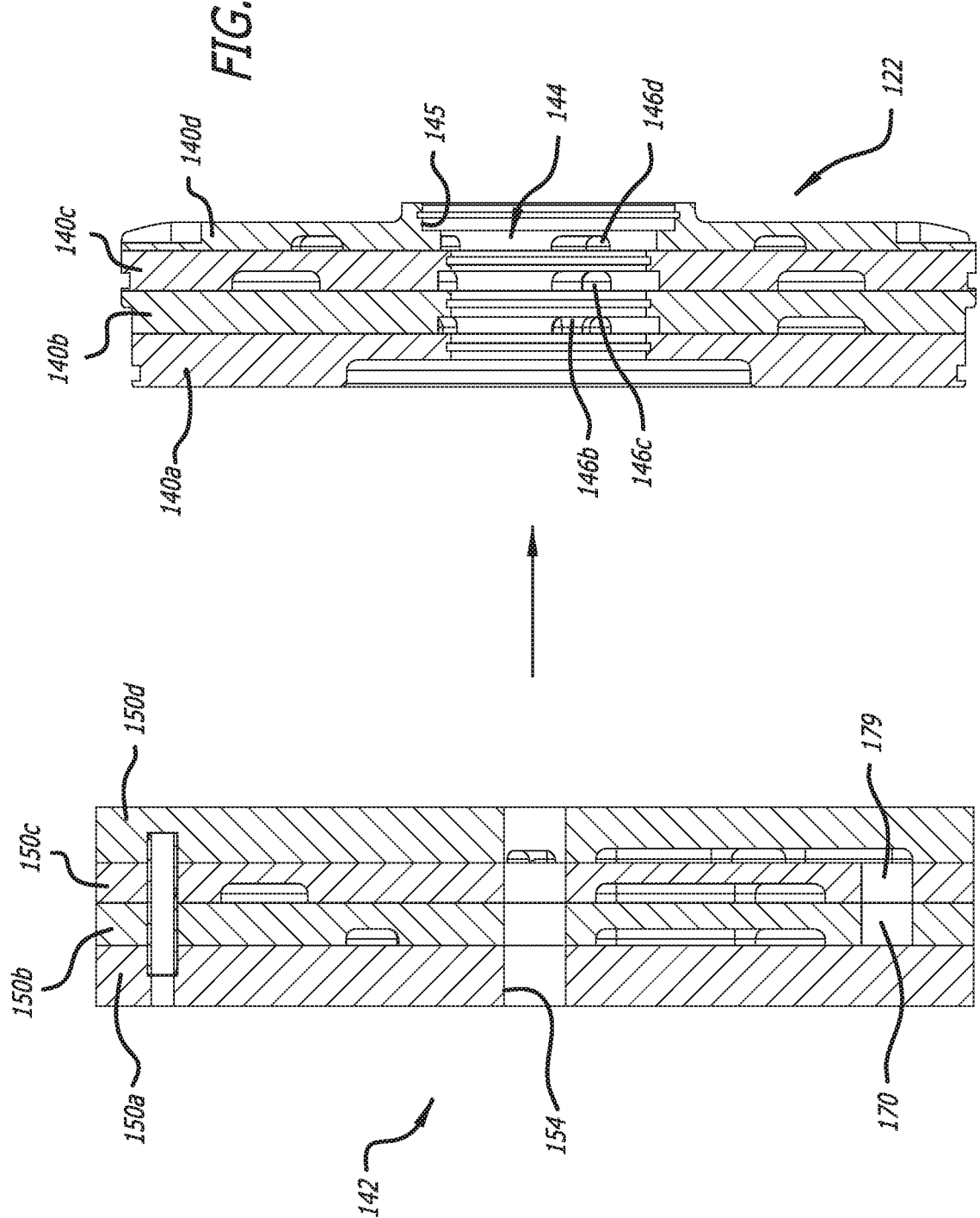

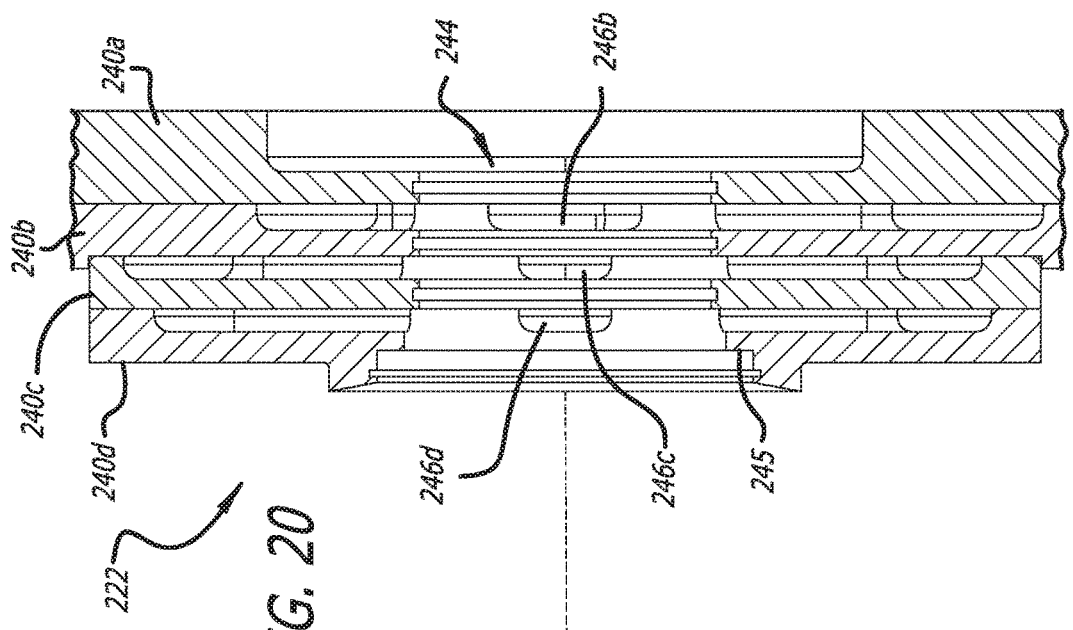
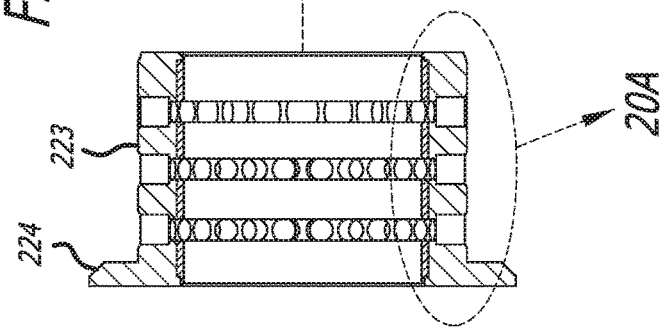
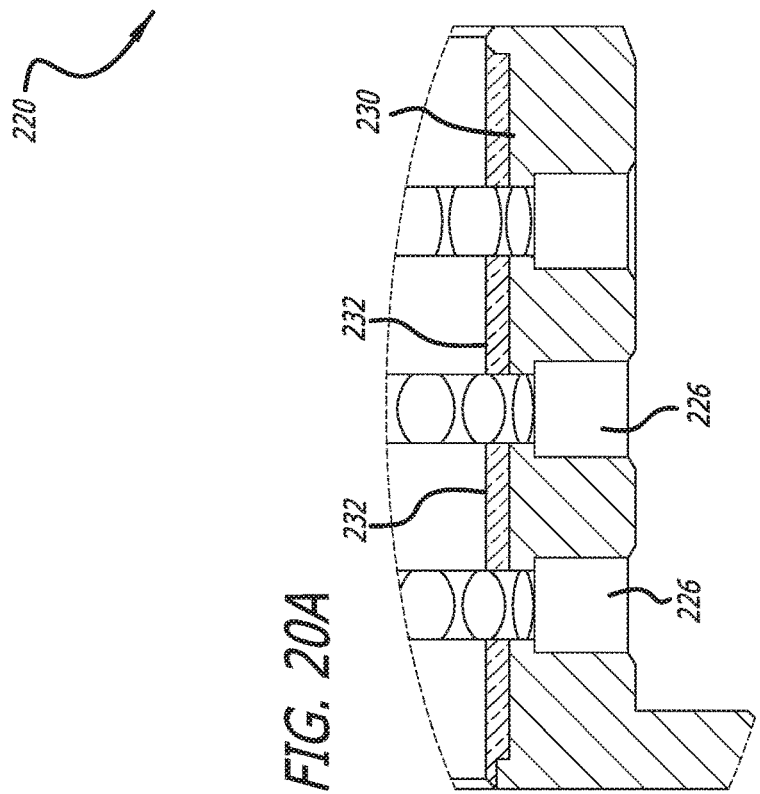

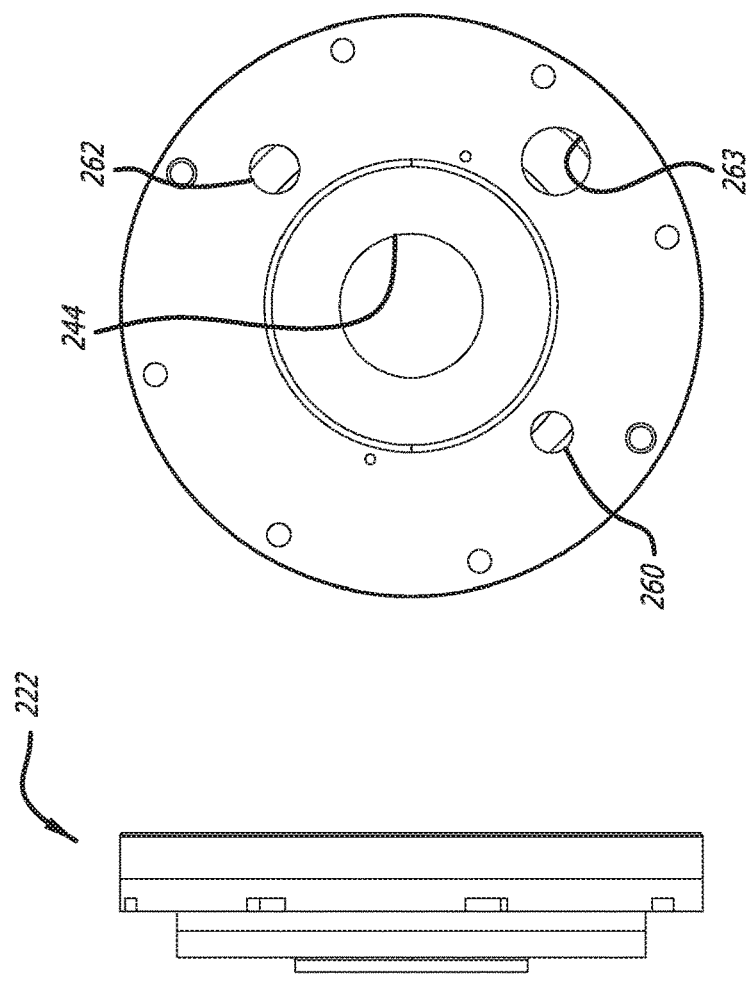
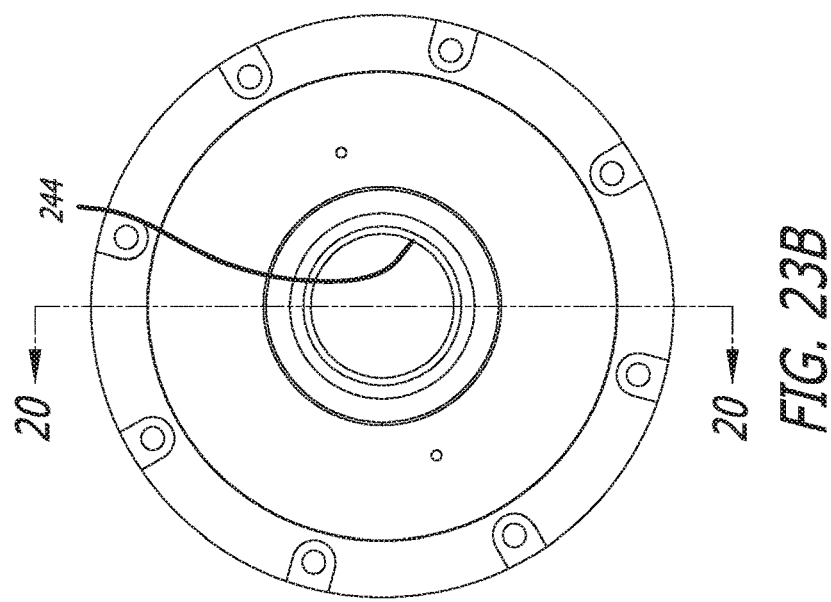

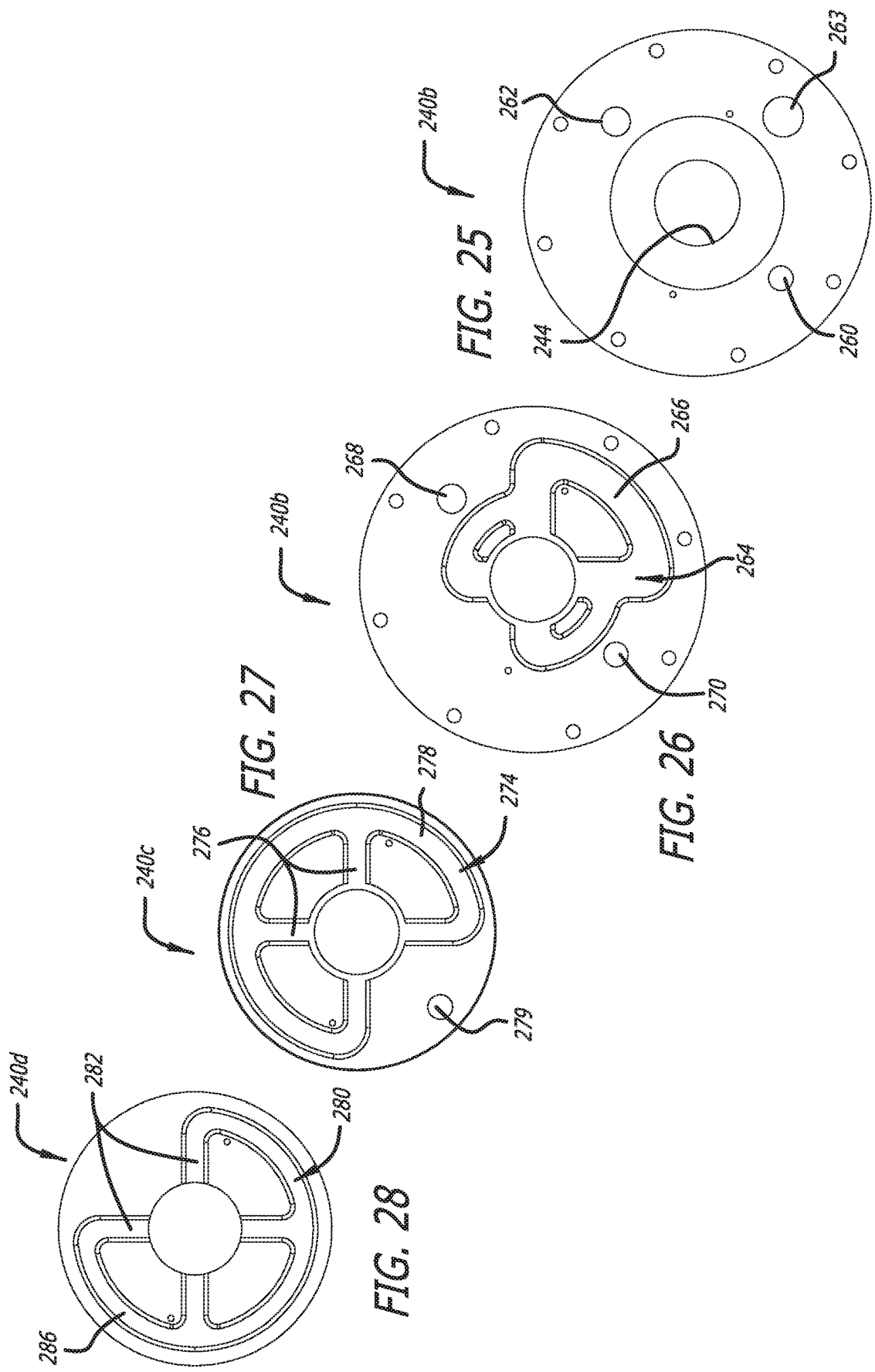

TURBOEXPANDER LABYRINTH SEAL

RELATED APPLICATIONS

The present application claims priority under 35 U.S.C. § 119 to U.S. Provisional Application No. 62/783,536, filed Dec. 21, 2018.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to low loss labyrinth seal configurations for turbomachines, gas turboexpanders and the like.

Description of the Related Art

A turboexpander, also referred to as a turbo-expander or an expansion turbine, is a radial or axial flow turbine through which a gas is expanded to produce refrigeration work that is often used to drive a compressor or generator. Because work is extracted from the expanding gas, the expansion is approximated by an isentropic process (i.e., a constant entropy process) and the low-pressure exhaust gas from the turbine can be at a very low temperature, −150° C. or less depending upon the operating pressure and gas properties. Partial liquefaction of the expanded gas is not uncommon.

Turboexpanders are used to extract hydrocarbon liquids from natural gas, for power generation, as a source of refrigeration in industrial processes, and for other uses. Since the early 1960s, turboexpanders have been increasingly used in hydrocarbon gas processing plants. The other primary market application of turboexpanders is for the production of industrial gases, such as oxygen. Reducing the production costs of industrial gases is fundamental to the viability of efficient and environmentally responsible global energy solutions, such as oxygen-based synthesis gas production and the liquefaction of natural gas using nitrogen as a refrigerant.

One important component of turboexpanders is the seal used to prevent leakage of high-pressure gas around the rotating shaft. Many turboexpanders, having high rotational speeds, use labyrinth seals due to their lack of friction and long life. A labyrinth seal provides a tortuous path to help prevent leakage, and on a rotating shaft, a very small clearance must exist between the tips of the labyrinth teeth and the running surface. The "teeth" of the labyrinth seal may be on the rotating shaft (Teeth On Rotor—TOR) or on the stator (TOS), or both, in an interlocking configuration. One example of a labyrinth seal is disclosed in U.S. Pat. No. 3,976,395 to Kalnin.

Despite many years of development, there remains a need for a low net loss labyrinth seal configurations for high-pressure gas turboexpanders and the like which is more efficient and reduces leakage of process gas.

DESCRIPTION OF THE DRAWINGS

FIG. 5 is a perspective view of an exemplary shaft for use in the turboexpander described herein;

FIG. 6 is an elevational view of the shaft of FIG. 5 showing two toothed regions on either end;

FIGS. 6A-6B are enlargements of the toothed regions on the shaft, and FIG. 6C is an enlarged cutaway view of a left end of the shaft;

FIG. 7 is an enlarged sectional view of a portion of the left end of the shaft showing the toothed region, and FIG. 7A is a blowup of several of the teeth thereon;

FIG. 9 is an exploded sectional view of carrier and runner components of the compressor-side labyrinth seal of FIG. 8 taken along line 9-9 in FIG. 12B, and FIG. 9A is an enlarged view of a portion of the runner component;

FIGS. 14-17 are elevational views of four discs of the carrier component of the compressor-side labyrinth seal showing flow channels and passages formed therein;

FIG. 18 is a juxtaposition of sectional views through the sandwiched discs that form the carrier component of the compressor-side labyrinth seal both before and after machining;

FIG. 20 is an exploded sectional view of carrier and runner components of the expander-side labyrinth seal of FIG. 19 taken along line 20-20 in FIG. 23B, and FIG. 20A is an enlarged view of a portion of the runner component;

FIGS. 23A-23C are side and end elevational views of the carrier component of the expander-side labyrinth seal;

FIGS. 25-28 are elevational views of four discs of the carrier component of the expander-side labyrinth seal showing flow channels and passages formed therein.

Figure 1:
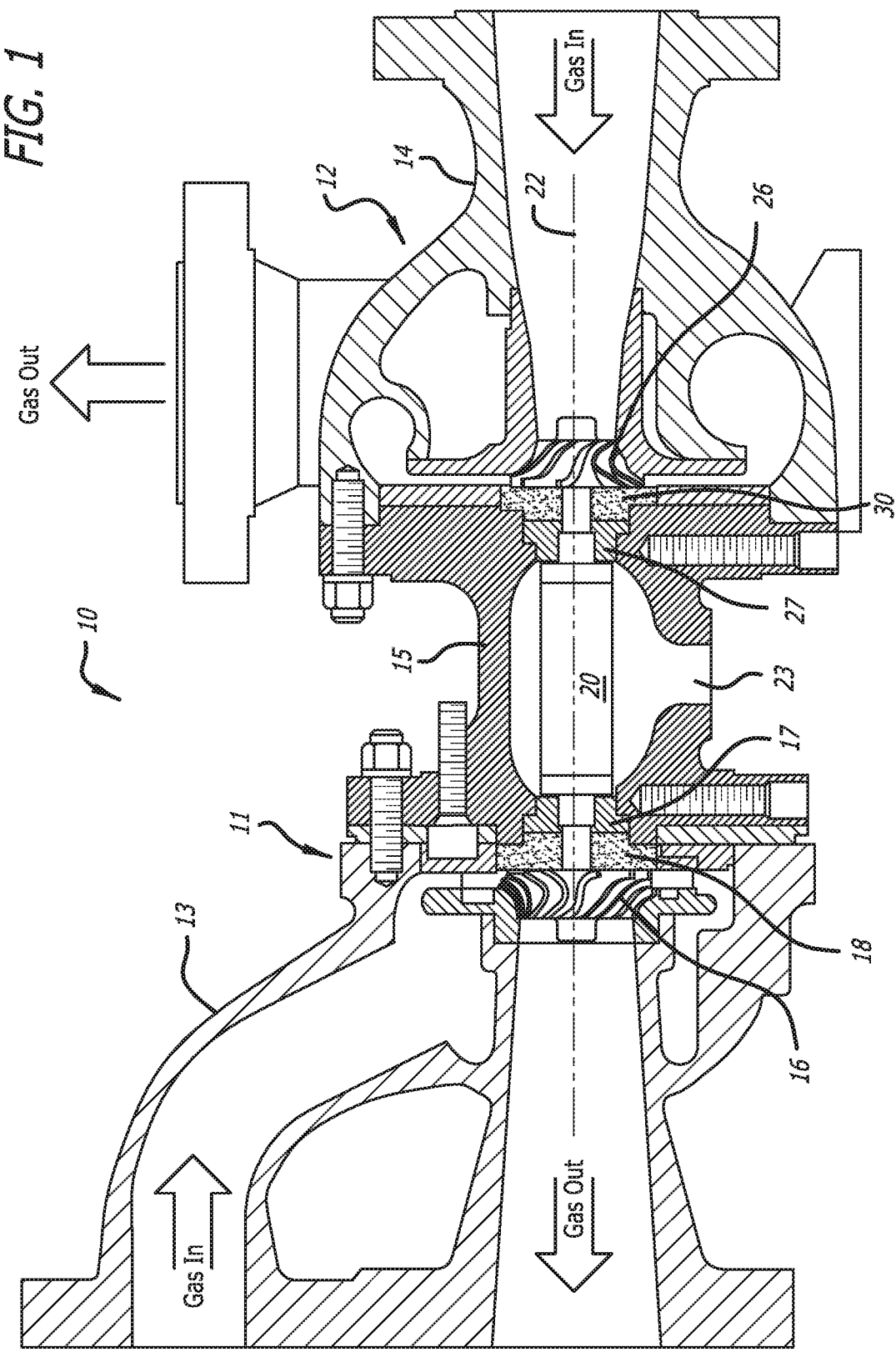
FIG. 1 is a cross sectional view through a conventional turboexpander in which the labyrinth seals of the present application may be installed.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

SUMMARY OF THE INVENTION

The present application provides a turboexpander having a labyrinth seal for reducing gas losses around a rotating shaft, comprising a rotating shaft defining a longitudinal axis of rotation and having a series of external teeth thereon along an axial segment. A compressor wheel is fixed to a first end of the shaft, and a bearing housing has bearings that support the shaft, the axial segment having teeth being located between the bearings and compressor wheel. A stationary labyrinth seal surrounds the axial segment of the shaft having teeth, the labyrinth seal having an inner lumen in contact with the teeth and a plurality of sets of inner openings in fluid communication with the axial segment. Each set of inner openings surrounds the shaft at a particular axial position, wherein the sets of openings extend in series from a first set of inner openings at a high pressure end of the axial segment adjacent the compressor wheel to a last set of inner openings at a low pressure end of the axial segment adjacent the bearings. Each set of inner openings leads to a flow channel common to those inner openings, and each flow channel is ported to a location separate from the other flow channels. When high pressure gas at the high pressure end of the axial segment leaks between the inner lumen of the labyrinth seal and the teeth and reaches the first set of inner openings, the high pressure gas is ported to a first recovery location. When medium pressure gas leaks between the inner lumen of the labyrinth seal and the teeth to reach a second set of inner openings in series with the first set of inner openings, the medium pressure gas is ported to a second recovery location. The process continues to the last set of inner openings whereby low pressure gas is ported to the atmosphere.

The labyrinth seal may comprise a sleeve-like runner surrounding and defining the inner lumen in contact with the shaft, the runner having a plurality of through holes around a circumference of the runner arranged in a plurality of axially-spaced rows, wherein each row of through holes is in fluid communication with one of the sets of inner openings. The carrier desirably comprises a plurality of axially stacked annular discs bonded together to define a central through bore within which is received the runner. One or more discs have grooves formed in one face thereof that form the flow channel in that disc and intersect the central through bore to form the set of inner openings in that disc. Some of the carrier discs may have axial shunt ports formed therein which route gas from at least one of the flow channels in one disc through an axial shunt port to an exit port in an end disc.

In one embodiment, there are exactly four of the carrier discs with three of the discs having inner openings such that gas that leaks between the inner lumen of the labyrinth seal and the teeth is removed and recovered in three stages with progressively reducing pressures. The carrier discs may be made of an aluminum alloy, while the runner maybe made of brass and have a series of babbitt lands in contact with an inner lumen thereof. The babbitt lands are formed of a soft metal that directly contacts and reduces friction with the teeth, wherein one of the babbitt lands is positioned between each two adjacent rows of through holes in the runner.

The turbo expander has the compressor wheel at a compressor end and an expander wheel at an expander end, and there are preferably two of the labyrinth seals provided around the shaft, one at the compressor end and one at the expander end. The expander end has an expander wheel fixed to a second end of the shaft and second bearings in the bearing housing, with a second set of teeth in a second axial segment between the second bearings and expander wheel. A second labyrinth seal is arranged around the shaft second axial segment, wherein both labyrinth seals include porting that directs low pressure gas to the bearing housing which is open to the atmosphere.

The second labyrinth seal desirably comprises a plurality of axially stacked annular discs bonded together to define a central through bore within which is received the runner, wherein one or more discs have grooves formed in one face thereof that form the flow channel in that disc and intersect the central through bore to form the set of inner openings in that disc.

Some of the carrier discs in the second labyrinth seal may have axial shunt ports formed therein which route gas from at least one of the flow channels in one disc through an axial shunt port to an exit port in an end disc. In one embodiment, there are exactly four of the carrier discs in the second labyrinth seal with three of the discs having inner openings such that gas that leaks between the inner lumen of the labyrinth seal and the teeth is removed and recovered in three stages with progressively reducing pressures. The carrier discs in the second labyrinth seal are desirably made of a glass epoxy laminate, while the runner is made of brass and has a series of babbitt lands in contact with an inner lumen thereof, the babbitt lands being formed of a soft metal that directly contacts and reduces friction with the teeth, wherein one of the babbitt lands is positioned between each two adjacent rows of through holes in the runner.

DETAILED DESCRIPTION

The present application discloses an improved labyrinth seal configuration which reduces the amount of process gas which escapes around the rotating shaft to the atmosphere. Because the process gas is very high purity and valuable, the objective is to lower the net loss of gas to the minimum possible for economic reasons.

FIG. 1 is a schematic longitudinal sectional view through a conventional turboexpander 10 in which the labyrinth seals of the present application may be installed. On the left side the turboexpander has an expander end 11 and on the right side a compressor end 12. The expander end 11 comprises a rigid housing 13 with flow passages therein connected to a rigid housing 14 with flow passages on the compressor end 12 via an intermediate rigid central bearing housing 15.

The expander end 11 receives high-pressure gas as indicated which flows radially inward through a plurality of chambers in the housing 13 arrayed around an expander wheel 16. The blades of the expander wheel 16 are such that they rotate from exposure to the inlet gas, and the gas is expanded on its way to an axially-oriented outlet as indicated. The expander wheel 16 is mounted on a shaft 20 aligned along a central axis 22 that is rotatably supported by one or more bearings 17. A seal 18 surrounding the shaft 20 is interposed between the expander wheel 16 and bearings 17 to impede high-pressure gas from traveling inward along the shaft to a chamber 23 formed within the central bearing housing 15.

The shaft 20 extends axially through the turboexpander to the compressor end 12. An axially-oriented compressor inlet as indicated leads to a compressor wheel 26, which is also mounted on the shaft 20 rotating from interaction with the gas in the expander end. The compressor wheel 20 acts on the inlet gas to increase its pressure which is then directed through a number of internal chambers in the rigid housing 14 and through a radially-directed compressor outlet as indicated. The compressor wheel 26 mounts on the shaft which is again rotatably supported by one or more bearings 27. A second seal 30 surrounds the shaft between the compressor wheel 26 and bearings 27 to impede high-pressure gas from traveling inward along the shaft to the chamber 23.

It should be understood that the overall turboexpander 10 illustrated in FIG. 1 is arranged conventionally, though the expander seal 18 and compressor seal 30 may be formed as described herein. That is, the expander seal 18 and compressor seal 30 are desirably the improved labyrinth seals which help reduce high-pressure gas losses within the turboexpander, which is thus improved overall.

Those of skill in the art will understand the various applications for turboexpanders, one of which is to convert inlet gas into partially liquid form, such as natural gas into liquid (LNG). The inlet gas to the expander end 11 is very cold and at or near saturation. As the gas passes through the expander end 11 it not only gets colder, but some of the heavier components will condense and liquefy. This liquid may be very valuable and is recovered.

Figure 2:
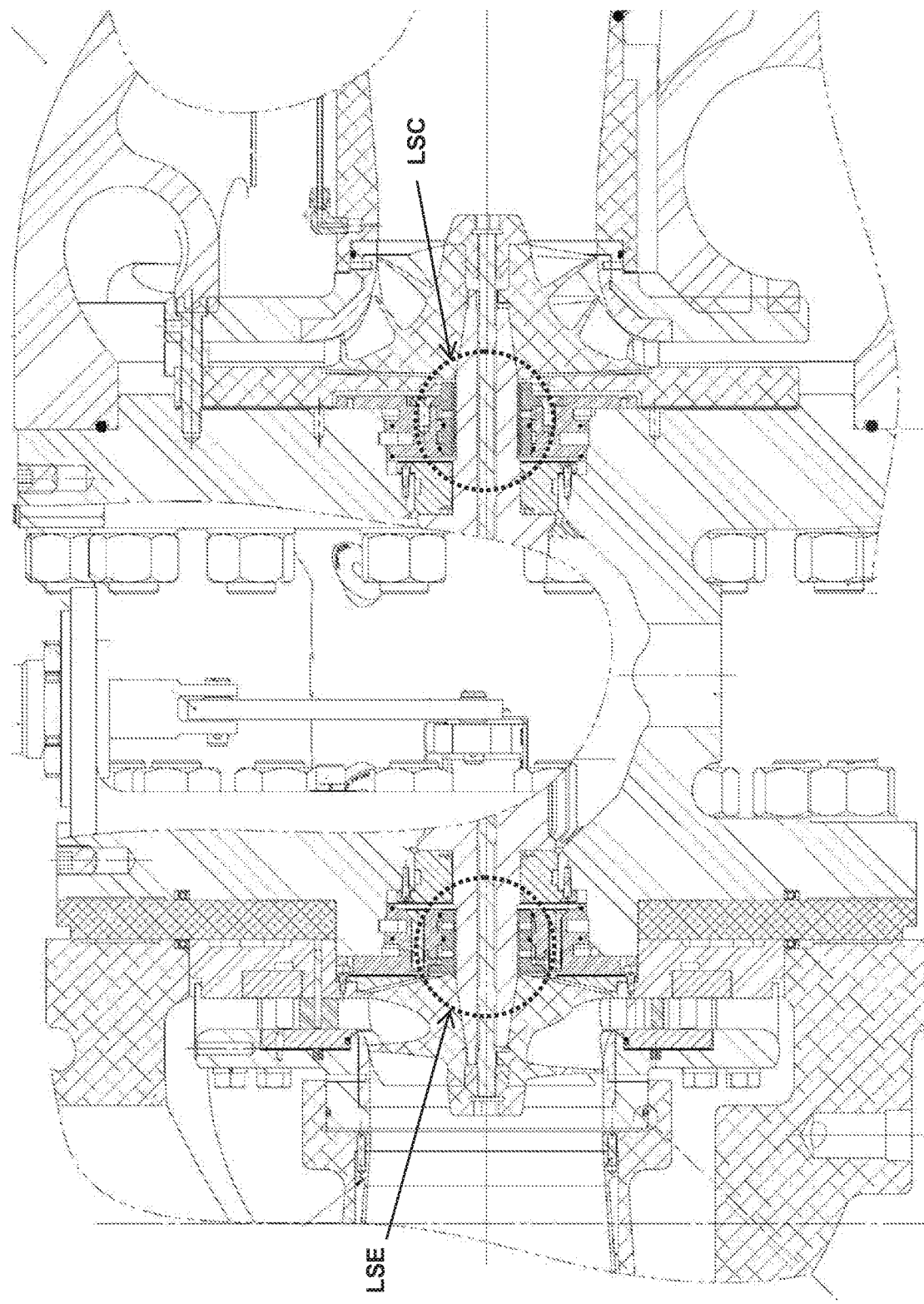
FIG. 2 is a sectional view of a middle portion of the turboexpander of FIG. 1 showing the location of standard labyrinth seals on both the expander and compressor ends.

FIG. 2 is a sectional view of a middle portion of the turboexpander of FIG. 1 showing the location of standard labyrinth seals LSE, LSC on the expander and compressor ends, respectively. The rotating shaft presents a potential avenue for escape of the high-pressure gas on either end of the turboexpander because of its rotational movement relative to the surrounding structures.

Figure 3B:
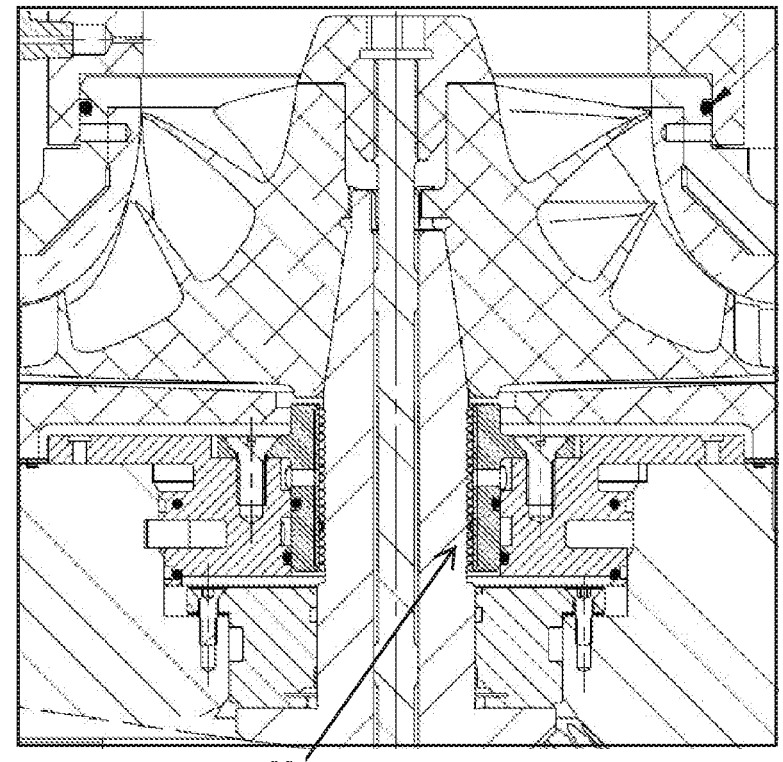
FIGS. 3A and 3B are close-ups of the labyrinth seals from FIG. 2.
Figure 3A:
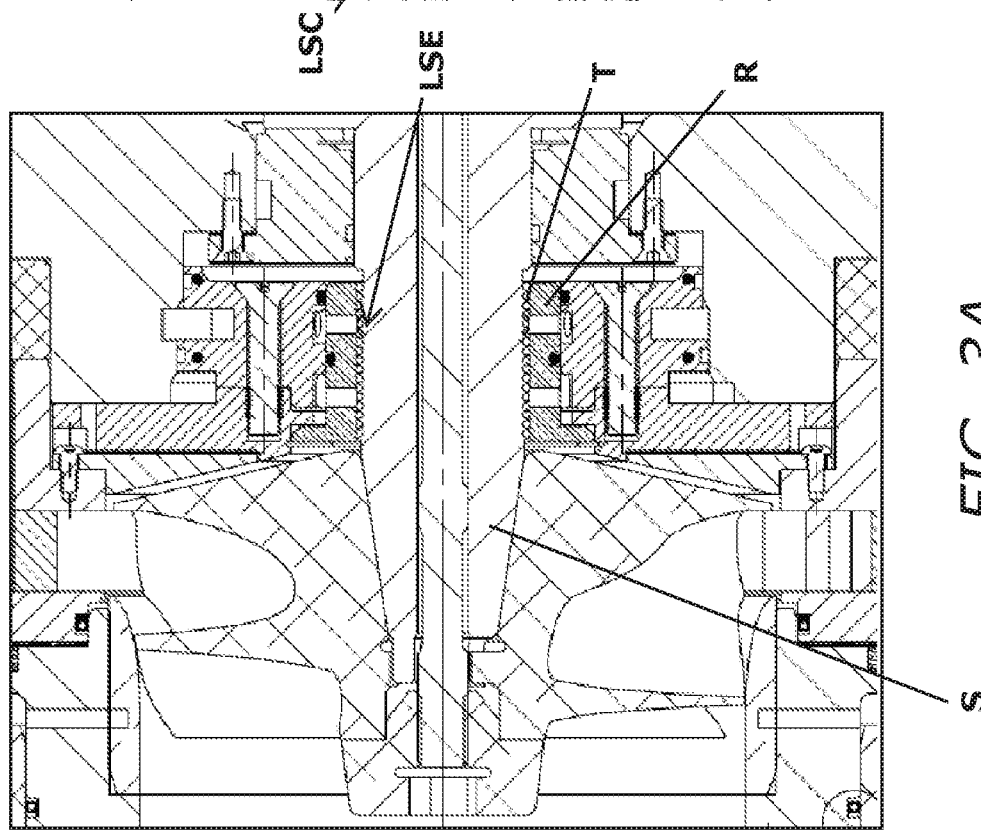

FIGS. 3A and 3B are close-ups of the labyrinth seals from FIG. 2. On the expander end in FIG. 3A, a labyrinth seal LSE comprises a plurality of teeth T formed on the exterior of the shaft S which come into close proximity with a surrounding ring R. The shaft S is metallic, while the ring R is made of a material which can withstand extremes of temperature, such as abradable metal (babbitt). The high-pressure gas (e.g., Nitrogen) around the expander wheel wants to travel to the right past the labyrinth seal LSE, but the series of teeth T reduces the pressure and flow rate. The bearing housing to the right of the labyrinth seal LSE is vented to the atmosphere.

FIG. 3B illustrates a similar labyrinth seal LSC on the compressor side which acts to prevent gas from traveling to the left around the shaft S. Despite years of development and improvement, labyrinth seals are not entirely effective, and some of the process gas, which is quite valuable, escapes to the atmosphere and is lost.

Figure 4:
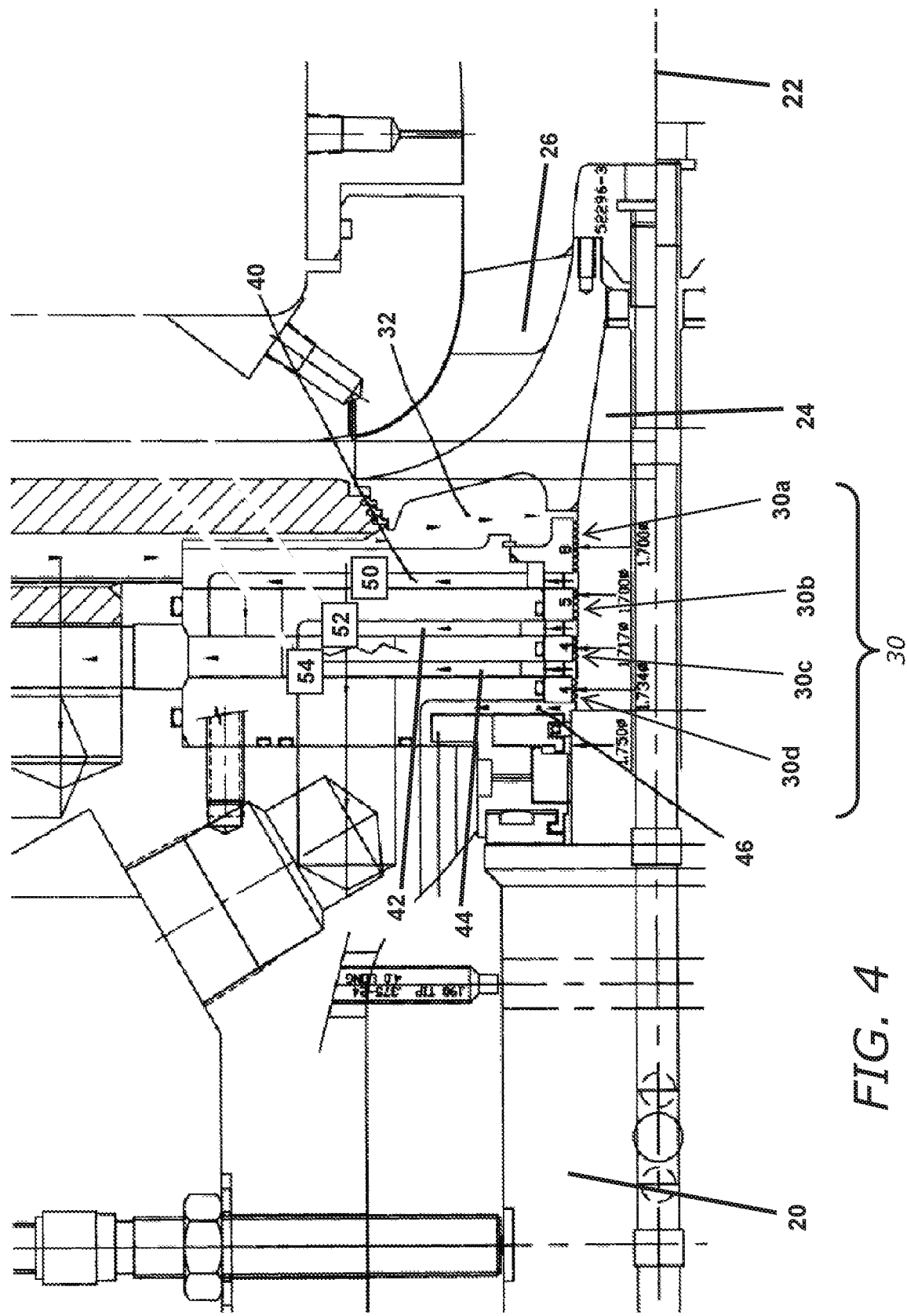
FIG. 4 is a sectional view of an exemplary labyrinth seal of the present application.

FIG. 4 is a sectional view of one half of an exemplary labyrinth seal 30 of the present application on the compressor end 12 of the turboexpander 10. The high-speed rotating shaft 20 defines the central longitudinal axis 22 which forms a centerline of the turboexpander. An assembly of components that rotate along with the shaft 20 includes a tapered shaft extension 24 and compressor wheel 26.

A labyrinth seal 30 extends along a length of the shaft extension 24 and comprises separate teeth and mating seal sets 30a, 30b, 30c and 30d, from right to left. The teeth are on the shaft 20 surrounded by an annular seal, as shown and also as shown in the conventional labyrinth seals of FIGS. 3A/3B. It is understood, however, that the teeth of the labyrinth seal may be on the rotating shaft (Teeth On Rotor—TOR), on the stationary housing or stator (TOS), or both in an interlocking configuration.

Each teeth and mating seal set 30a, 30b, 30c and 30d has a discrete number of annular teeth having an outer diameter sized slightly smaller than the inner diameter of the surrounding annular seal member. In a preferred embodiment, a first seal set 30a has a greater number of teeth than the other three seal sets. Of course, the number of teeth in each of the sets can be varied, and indeed the number of sets may be changed as well. Preferably, there are no less than three teeth and mating seal sets each having at least four teeth.

The compressor end of the turboexpander compresses the process gas, which fills a high-pressure chamber 32 adjacent to the shaft 20 and labyrinth seal. It is the pressurized gas within this chamber 32 (e.g., 1000 psig Nitrogen) that is susceptible to leaking past the labyrinth seal and being lost to the atmosphere in excess. The exemplary labyrinth seal assembly of the present application more effectively prevents this gas from escaping to the left around the shaft 20 past the labyrinth seal 30 and into the ambient environment, which naturally improves efficiency and economics.

The labyrinth seal 30 provides a series of vent ports in between each of the seal sets 30a, 30b, 30c and 30d. This gradually reduces the pressure of the process gas, and the high-pressure gas is recovered and recycled within the process. In particular, a first vent port 40 opens to the exterior of the shaft extension 24 in between the first and second seal sets 30a, 30b. A second vent port 42 opens to the exterior of the shaft extension 24 in between the second and third seal sets 30b, 30c. A third vent port 44 opens to the exterior of the shaft extension 24 in between the third and fourth seal sets 30c, 30d. The fourth vent port 46 opens to the exterior of the shaft extension 24 to the left of the fourth seal set 30d. Although four vent ports are shown, for three successive pressure recovery paths, there may be as few as three and more than four.

Vent ports 40 and 42 are routed to locations within the system where the pressure is appropriately reduced in stages, while reducing the gas eventually lost through the fourth and final vent port 46. The third vent port 44 is connected to a gas recovery compressor which maintains the pressure in port 44 to a low value while returning the gas to a suitable location for use within the process, again reducing the volume of gas that reaches the fourth vent port 46. The fourth vent port 46 exits into the bearing housing 15 at atmospheric pressure so that any gas remaining is lost.

The high-pressure process gas in the chamber 32 inevitably partly escapes between the first seal set 30a and the shaft extension 24. Because of the resistance created by the first seal set 30a, the gas that escapes into the first vent port 40 is at a lower pressure (e.g., 600 psig) than that within the high-pressure chamber 32. A first recovery chamber 50 is schematically shown to indicate the destination of the gas that escapes into the first vent port 40. In the same manner, some of the gas within the first vent port 40 escapes around the shaft 20 past the second seal set 30b and into the second vent port 42, which is at a lower pressure (e.g., 300 psig) than within the first vent port 40. A second recovery chamber 52 is schematically shown to indicate the destination of the gas that escapes into the second vent port 42. Likewise, some gas (e.g., 150 psig) escapes past the third seal set 30c into the third vent port 44, and is routed to a recovery compressor. Of course, these pressures are exemplary only and may differ depending on any specific system parameters.

Consequently, the labyrinth seal is designed such that the remaining gas that ultimately reaches the fourth vent port 46 is at atmospheric pressure and is lower than that in the third vent port 44 which in turn is lower than that in the second vent port 42, and so on. In a preferred embodiment, the pressure within vent port 44 is slightly above atmospheric and therefore the net loss of process gas through port 46 is very low. The gas that reaches the recovery chambers 50, 52, 54 is then routed to appropriate points within the system recovery compressor to elevate those gasses back to the process pressure. Since the chambers 50, 52, 54 are at different pressures, only as much energy as needed is spent raising the respective pressures back to the process pressure, which of course reduces energy costs in the recovery process.

A more detailed explanation of the labyrinth seals of the present application is provided below. The discussion above with regard to how the labyrinth seal functions remains generally the same. Prior to a discussion of the compressor- and expander-side labyrinth seals, however, an understanding of a shaft used in the turboexpander is instructive.

FIG. 5 is a perspective view and FIG. 6 an elevational view of an exemplary shaft 20 for use in the turboexpander described herein. The shaft 20 includes a large central portion 60 which extends between the expander end 11 and compressor end 12. The smaller diameter shaft extensions 24a, 24b project from shoulders 61a, 61b formed at either end of the central portion 60 and each have thereon three distinct regions: an outer wheel mounting region 62a, 62b, an inner bearing land 64a, 64b, and between them an axially-extending seal region 66a, 66b having teeth 68. The wheel mounting regions 62a, 62b receive the expander and compressor wheels, respectively, while the cylindrical bearing lands 64a, 64b received the bearings on which the shaft 20 rotates. The teeth 68 in each of the seal regions 66a, 66b are shown enlarged in FIGS. 6A-6B.

In one embodiment, the lengths of the seal regions 66a, 66b are dissimilar, with the region 66b on the right for the compressor end 12 being axially longer than the region 66a on the left for the expander end 11. Also, the seal region 66b has more has the same configuration but more teeth than the seal region 66a. The lengths and configurations of the wheel mounting regions 62a, 62b and inner bearing lands 64a, 64b are desirably the same on both sides. The shaft 20 is desirably machined of Stainless Steel.

Figure 8:
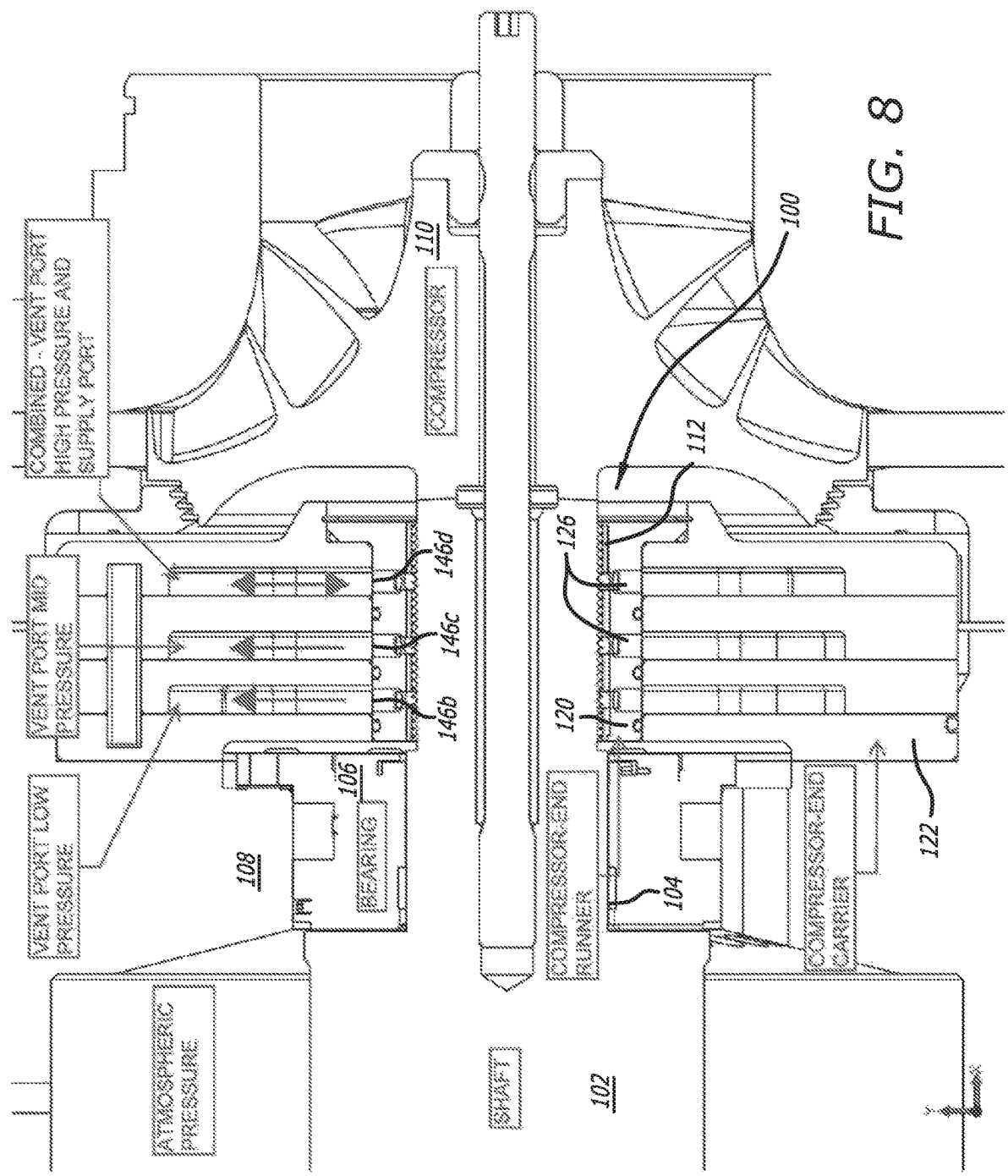
FIG. 8 is a sectional view similar to that of FIG. 3B showing a labyrinth seal at a compressor end of the turboexpander.

Now with reference to FIG. 8, a sectional view similar to that of FIG. 3B shows a labyrinth seal 100 of the present application at the compressor end of a turboexpander. A shaft 102 is shown with a bearing land 104 surrounded by a bearing 106 held within a bearing housing 108. A compressor wheel 110 mounts to an outer end of the shaft 102 and rotates therewith.

Between the bearing land 104 and compressor wheel 110, the shaft 102 includes a series of exterior teeth 112 which cooperate with a seal assembly to form the exemplary labyrinth seal 100. The seal assembly comprises a sleeve-like tubular runner 120 directly surrounding the shaft 102 and an annular carrier 122 surrounding the runner. As will be shown in more detail below, the carrier 122 includes a series of axially-stacked discs which are bonded together and define the aforementioned pressure reduction cavities, as was explained with respect to FIG. 4. Prior to a discussion of the functioning of the labyrinth seal 100, its structural components will be described in detail.

Figure 11:
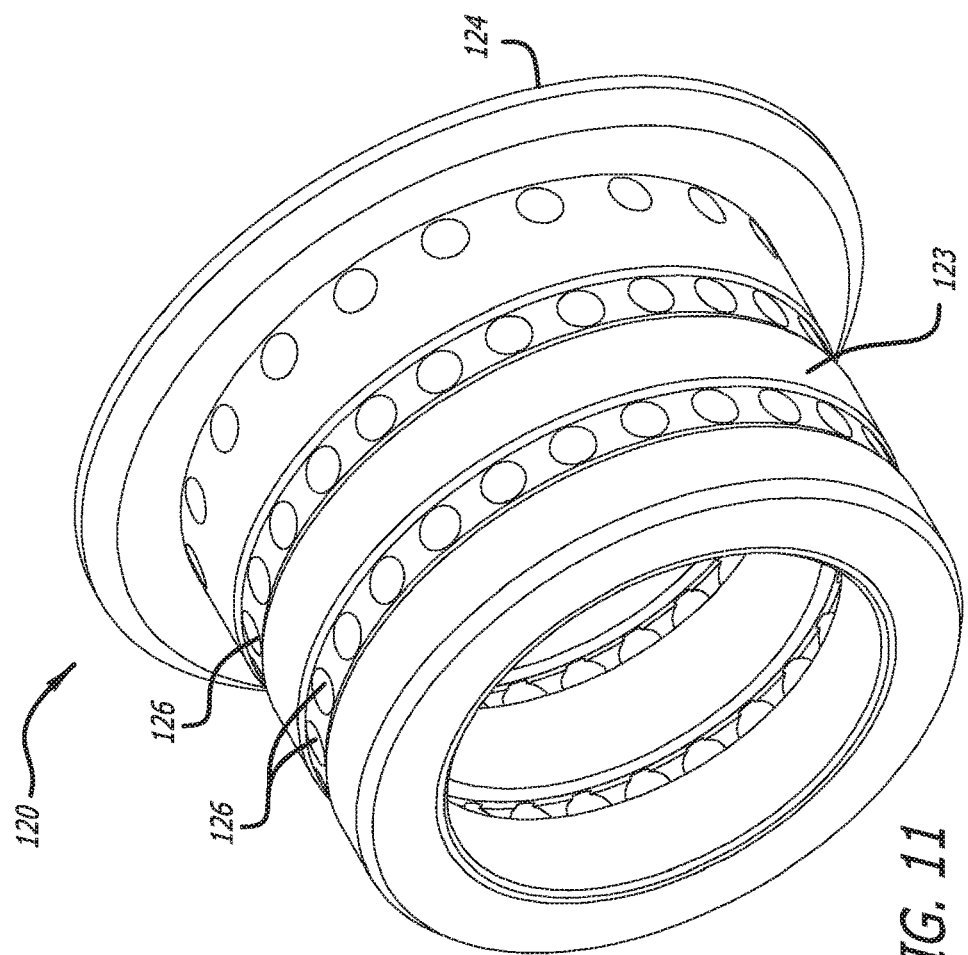
FIG. 11 is a perspective view of the runner component of the compressor-side labyrinth seal.
Figure 10:
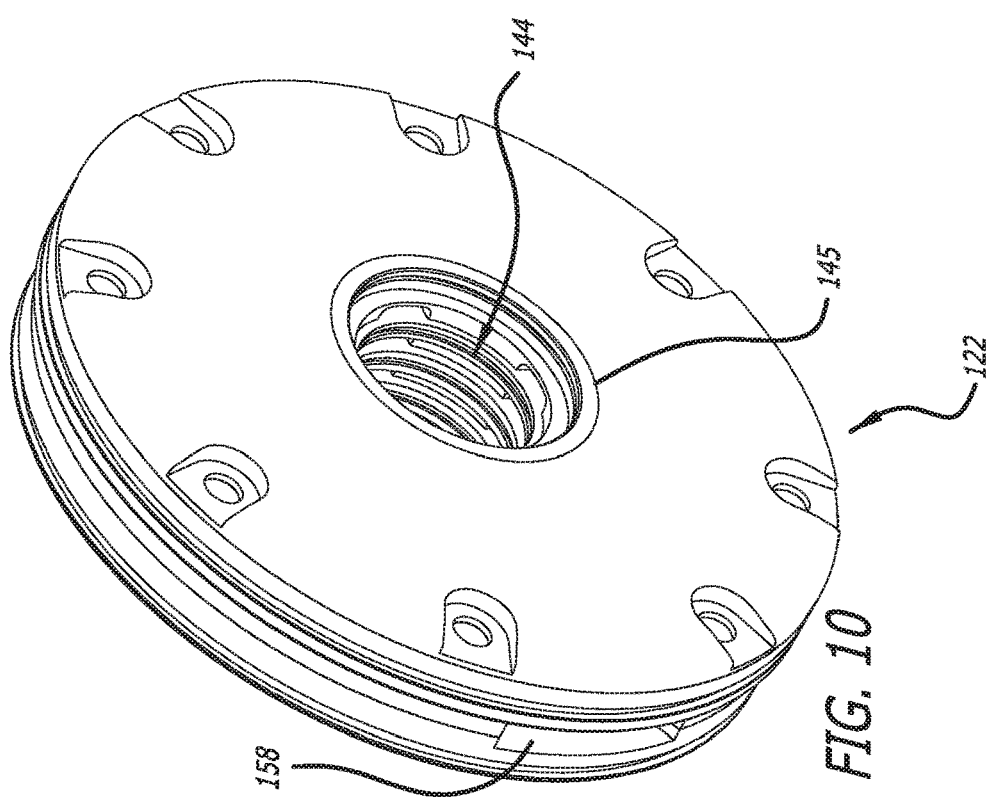
FIG. 10 is a perspective view of the carrier component of the compressor-side labyrinth seal of the present application.

FIG. 9 is an exploded sectional view of the runner 120 and carrier 122 components of the compressor-side labyrinth seal 100 of FIG. 8, FIG. 9A is an enlarged view of a portion of the runner, and FIGS. 10 and 11 are perspective views of these components. As mentioned, the runner 120 has a generally tubular portion 123 with a radial flange 124 on one end. The runner 120 is perforated with a series of rows of radially-oriented through holes 126. More particularly, there are three rows of radially-oriented through holes 126, each row extending circumferentially around the body of the runner 120 in an evenly-spaced manner. In one embodiment, there are 24 evenly-spaced through holes 126 in each row, though the number may be more or less as desired. As will be explained, the through holes 126 permit any gas that escapes around the shaft 102 to pass therethrough into the pressure reduction cavities defined by the surrounding carrier 122.

The runner 120 is desirably machined out of brass and includes a series of internal ribs and grooves 130 in between the rows of through holes 126, as best seen in FIG. 9A. These ribs and grooves 130 engage and axially fix the position of a series of inner babbitt lands 132. The babbitt lands 132 directly surround the teeth 112 on the shaft 102 and provide a wear buffer. More particularly, the babbitt lands 132 are typically made of a soft metal such as lead characterized by its resistance to galling. In a preferred embodiment, the babbitt lands 132 are formed of an alloy composed of Tin (Sn), Antimony (Sb) and Copper (Cu).

FIG. 9 is a partial sectional view through the carrier 122 comprising four axially-stacked and bonded discs. In particular, from left to right, there is a first disc 140a, a second disc 140b, a third disc 140c, and a fourth disc 140d. The four discs form a sandwiched assembly 142 as seen in FIG. 10 having a central through bore 144 that receives the tubular portion 123 of the runner 120, with the radial flange 124 engaging an annular step 145 at the right end of the through bore, as best seen in FIG. 8. Although four discs are shown, for three successive lower pressure recovery paths, there may be as few as three and more than four.

Figure 12C:
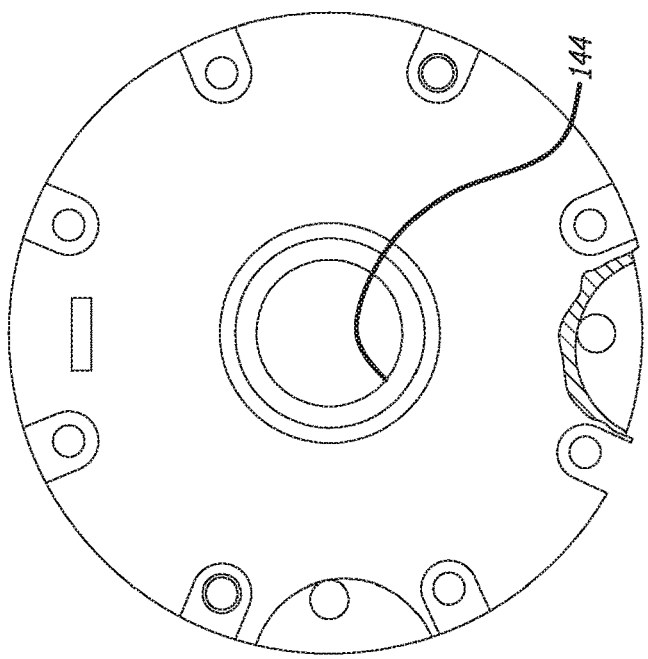
FIGS. 12A-12C are side and end elevational views of the carrier component of the compressor-side labyrinth seal.
Figure 12A:
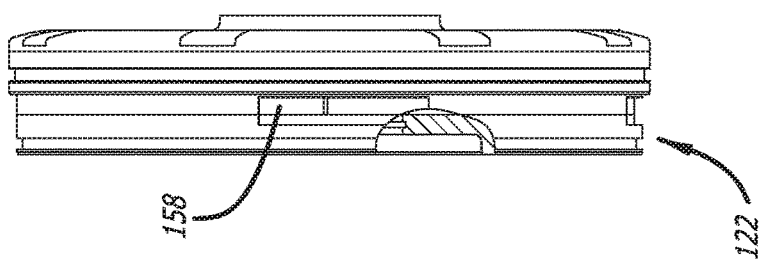
Figure 12B:
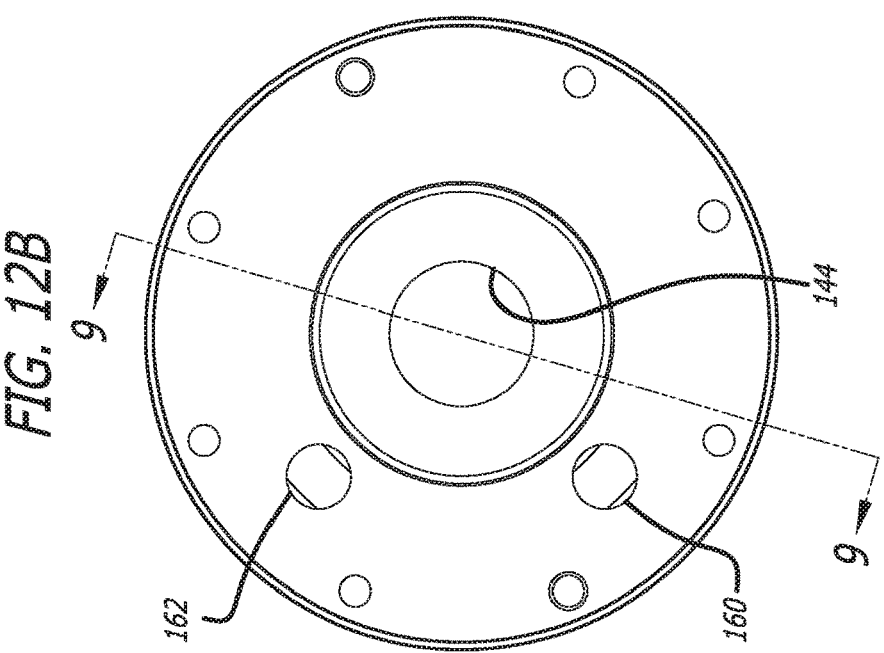

The sectional view in FIG. 9 is taken at an angle from the vertical through the center of the assembly 142 as seen in FIG. 12B. Each of the second, third, and fourth discs 140b, 140c, 140d have channels cut into their left faces, as best seen in FIGS. 13-17, which intersect with the central through bore 144. Three inner openings 146b, 146c, 146d are shown, respectively, at the inner annulus of each of the three discs 140b, 140c, 140d in FIG. 9. As will be clear below, however, each of these three discs 140b, 140c, 140d has channels which form four of the inner openings 146b, 146c, 146d to the through bore 144 at 90° apart; namely, horizontal left and right and vertical up and down. The inner openings 146b, 146c, 146d are seen in FIG. 9 offset from the horizontal midline only because of the angled section used.

With reference back to FIG. 8, which is a vertical sectional view through the labyrinth seal 100, upper and lower ones of the four inner openings 146b, 146c, 146d in the respective discs are shown aligned with through holes 126 in the runner 120. In this manner, the inner openings 146b, 146c, 146d are placed in fluid communication with the exterior of the shaft 102.

Figure 13:
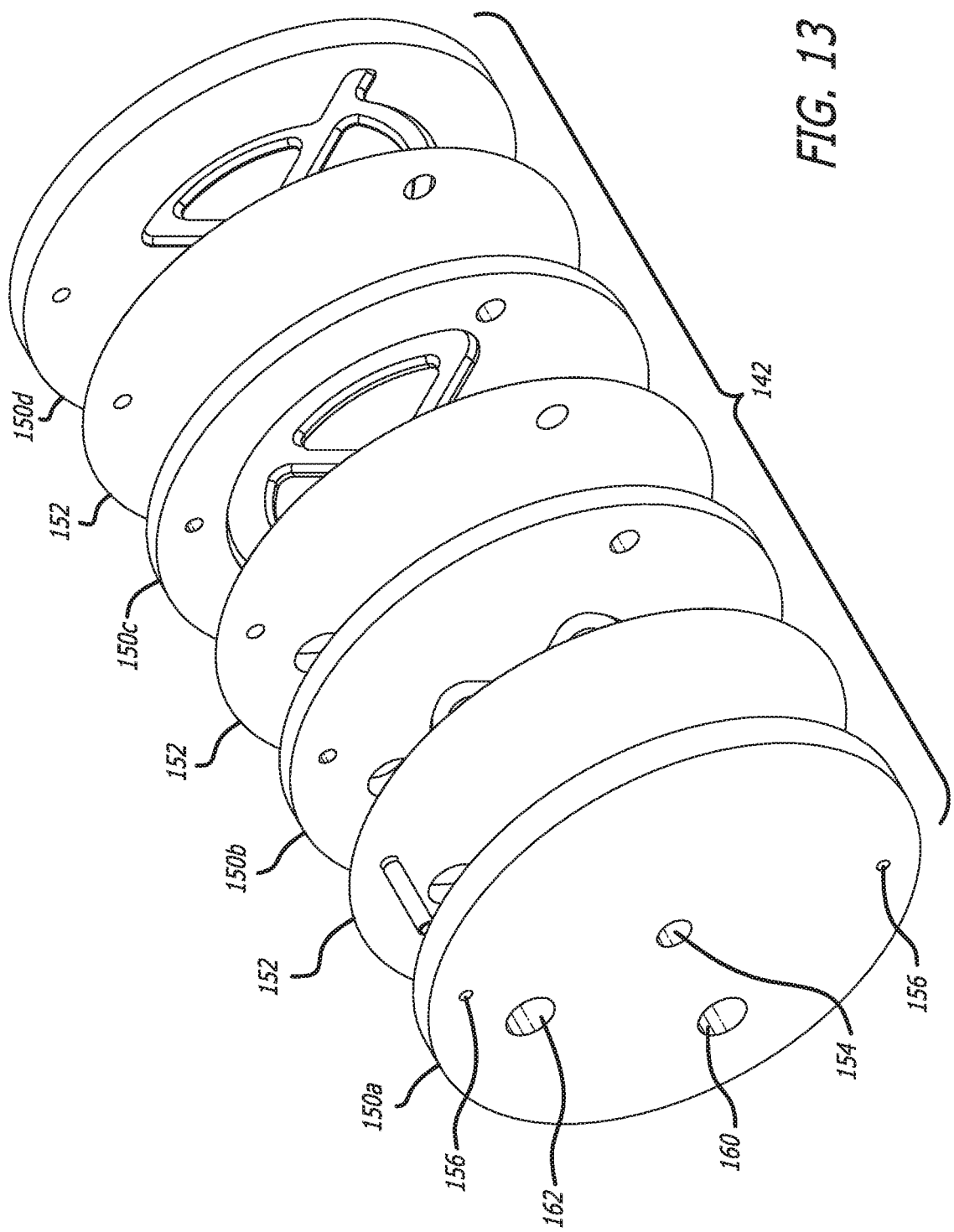
FIG. 13 is a perspective exploded view of a plurality of unfinished discs used to form the carrier component of the compressor-side labyrinth seal.

To better understand the channeled flow through the labyrinth seal 100 which reduces gas loss, a better understanding is necessary of the shape of the discs in the sandwiched assembly 142 that makes up the carrier 122. FIG. 13 is a perspective exploded view of a plurality of unfinished discs used to form the carrier component of the compressor-side labyrinth seal 100. The unfinished discs are numbered left to right as a first disc 150a, a second disc 150b, third disc 150c, and a fourth disc 150d. Three thin brazing discs 152 interposed in the inner spaces between the four discs 150a, 150b, 150c, 150d are utilized to bond the discs together. That is, the carrier discs 150a, 150b, 150c, 150d are desirably formed of aluminum alloy and made out of circular plates that are milled for internal passages, brazed together, and again milled for flow passages. Prior to machining the final contours of the carrier 122, the four unfinished discs 150a, 150b, 150c, 150d are bonded together via brazing utilizing the thin intermediate brazing discs 152.

Each of the unfinished carrier discs 150a, 150b, 150c, 150d has a central through bore 154 machined therein, as well as diametrically opposed alignment holes 156. Alignment pins (not shown) pass through the alignment holes 156 prior to bonding to ensure that the discs are properly rotationally aligned.

FIG. 18 schematically shows the change in shape between the sandwiched unfinished discs 150a, 150b, 150c, 150d to the disc assembly 142 that makes up the carrier 122. Following bonding of the unfinished discs 150a, 150b, 150c, 150d together, the central through bore 144 as well as several exterior steps are machined to create the finished product.

FIGS. 14-17 are elevational views of the four unfinished discs 150a, 150b, 150c, 150d showing the channels mentioned above machined in the left face of three of the discs, as well as several other flow ports. For the sake of understanding, each of the discs 150a, 150b, 150c, 150d shown in elevational view in FIGS. 14-17 with an angular reference system having 0° up (12:00 o'clock) and 180° down (6:00 o'clock). Various channels in the discs are located in discrete quadrants defined by this reference system, with a first quadrant being located clockwise from 0° (i.e., 0-90°) and so on. This orientation is preferably how the discs are assembled into the larger turboexpander, though the final orientation relative to the overall system may be altered.

The first disc 150a has a first exit port 160 positioned approximately midway between the center and outer edge of the disc and rotationally oriented at approximately 225° (7:30 o'clock). A second exit port 162 through the first disc 150a is also positioned approximately midway between the center and outer edge of the disc and rotationally oriented at approximately 315° (10:30 o'clock). These exit ports 160, 162 are also shown in the finished carrier 122 in FIG. 12B. As will be explained, the exit ports 160, 162 channel the gases captured as they pass through the labyrinth seal 100 so that these gases may be re-pressurized and reused. NPT (National Pipe Tapered threads) fittings shown) are attached to the exit ports 160, 162 so that conduits may be connected for routing the gasses to the appropriate locations.

The second disc 150b defines a channel 164 in the left face that includes four radial fingers 165 at 90° apart extending toward the central through bore 154 and connecting passages leading to an arcuate passage 166 only in the third quadrant with a curvature centered at the center of the disc. The arcuate passage 166 is located approximately midway between the center and outer edge of the disc 150b, and thus aligns with the first exit port 160 in the first disc 150a. After the assembly of discs has been machined into the final carrier 122, as seen in FIG. 18, the central through bore 154 is an enlarged to the contours of the through bore 144 which intersects with the radial fingers 165 to form the four inner openings 146b, as seen in FIG. 9. Gas that has leaked around the shaft 102 and reaches the second disc 150b passes outward through the openings 146b and into the channel 164. The gas eventually reaches the arcuate passage 166 and is thus in communication with the first exit port 160 in the first disc 150a. This is the lowest pressure gas that leaks around the shaft 102, and the exit port 160 thus vents into an ambient atmosphere. For example, with regard to the system shown in FIG. 1, the low-pressure gas eventually finds its way into the chamber 23 formed within the central bearing housing 15.

The second disc 150b also has a shunt port 168 extending axially therethrough aligned with the second exit port 162 in the first disc 150a. Furthermore, the second disc 150b has a pair of smaller ports 170 extending axially therethrough and located adjacent to the outer edge 171 of the disc at 90° and 180°.

The third disc 150c defines a channel 174 which has four radial fingers 176 extending inward toward the central through bore 154. Again, once the carrier 122 has been machined, the larger through bore 144 connects with the fingers 176 to form the four inner openings 146c, seen in FIG. 9. The channel 174 further includes an arcuate passage 178 that extends approximately 270° around the center of the disc in the first, third and fourth quadrants. Mid-pressure gas that leaks around the shaft 102 and finds its way to the inner openings 146c passes outward into the arcuate passage 178 which is in fluid communication with the shunt port 168 extending axially through the second disc 150b. The shunt port 168 is also aligned with the second exit port 162 in the first disc 150a, so that mid-pressure gas is sent to the left face of the carrier 122. Again, this gas can be recaptured, re-pressurized and thus reused.

The third disc 150c further includes a pair of shunt ports 179 adjacent to the outer edge and extending axially through the disc. The shunt ports 179 are at 90° and 180° and align with a channel 180 in the fourth disc 150d, as will be explained below.

Finally, in the fourth disc 150d, the channel 180 in its left face again has four radial fingers 182 extending inward toward the central through bore 154, which form the inner openings 146d to the larger through bore 144 of the finished carrier 122. The fingers 182 lead outward to one of two types of arcuate passages: two identical and diametrically-opposed arcuate passages 184 in the first and third quadrants, and a single arcuate passage 186 in the second quadrant. The single arcuate passage 186 has a larger radius of curvature than the other two arcuate passages 184. The channel 180 also has two outwardly-directed fingers 188 at 90° and 180°. These fingers 188 align with the shunt ports 179, 170 in the third and second discs 150c, 150b, respectively. High-pressure (HP) gas which initially leaks around the shaft 102 and reaches the inner openings 146d passes outward into the channel 180 and eventually to the fingers 188 and then to the shunt ports 179 and smaller ports 170 in the second disc 150b.

FIG. 15 shows small pilot holes leading from the shunt ports 170 in the second disc 150b to the outer edge 171. These holes are drilled into the unfinished second disc 150b to indicate where the shunt ports 170 are following bonding of the unfinished discs together to form the assembly 142. Subsequently, as shown in FIGS. 10 and 12A, large rectangular passages 158 are machined from the outer edge 171 inward to intersect the shunt ports 170, thus providing a passage for the high-pressure gas that has leaked. The high-pressure gas passes outward through fittings and conduits (not shown) connected to the rectangular passages 158 to be recaptured and reused. The shunt ports 170 and 179 and rectangular passages 158 are provided in the illustrated embodiment to accommodate porting in the surrounding bearing housing, and are not necessary in other designs. That is, the HP gas that enters the channel 180 in the fourth disc 150d may be directly ported radially outward from the fourth disc 150d, or through another recovery pathway, and the illustrated embodiment is merely for design purposes.

As mentioned, though four discs are shown, for three successive pressure recovery paths, there may be as few as three and more than four depending on the process parameters. At some point the axial length of the teeth segment on the shaft limits the number of discs that can be used.

Figure 19:
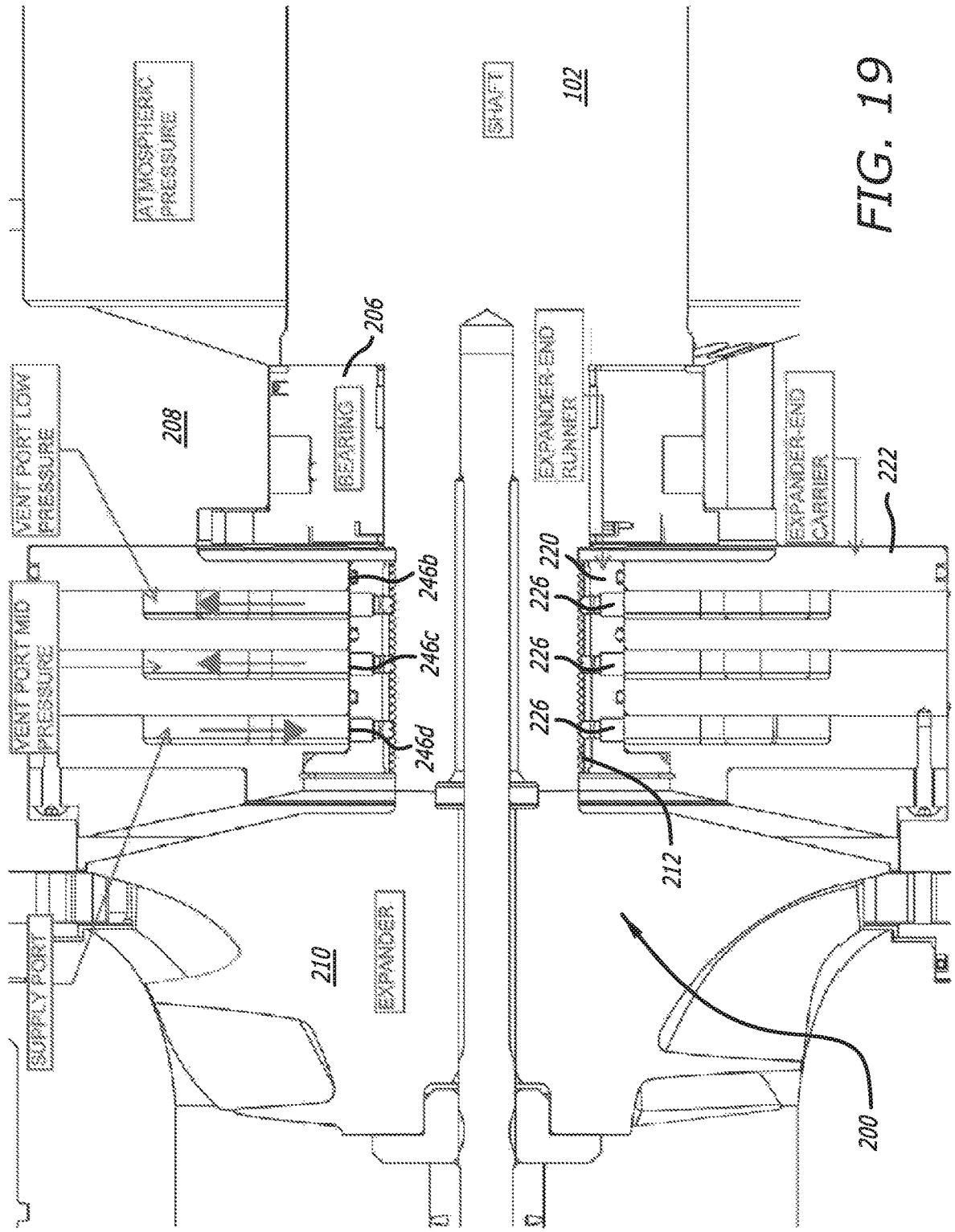
FIG. 19 is a sectional view similar to that of FIG. 3A showing a labyrinth seal at an expander end of the turboexpander.

FIG. 19 is a sectional view similar to that of FIG. 3A showing a labyrinth seal 200 at the expander end of the turboexpander. The shaft 102 is shown with a bearing land surrounded by a bearing 206 held within a bearing housing 208. An expander wheel 210 mounts to an outer end of the shaft 102 and rotates therewith.

Between the bearing land and expander wheel 210, the shaft 102 includes a series of exterior teeth 212 which cooperate with a seal assembly to form the exemplary labyrinth seal 200. The seal assembly comprises a sleeve-like tubular runner 220 directly surrounding the shaft 102 and an annular carrier 222 surrounding the runner. As will be shown in more detail below, the carrier 222 includes a series of axially-stacked discs which are bonded together and define the aforementioned pressure reduction cavities as was explained with respect to the compressor side. Prior to a discussion of the functioning of the labyrinth seal 200, its structural components will be described in detail.

Figure 22:
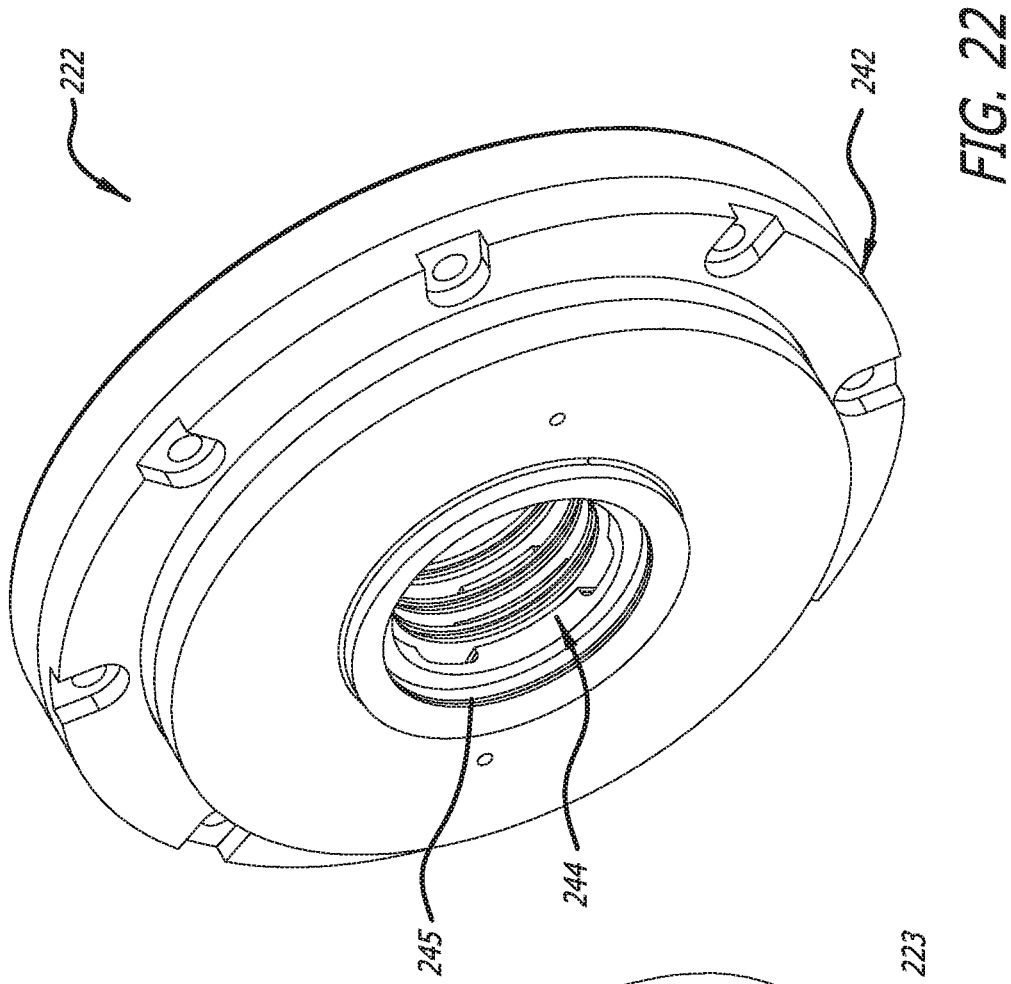
FIG. 22 is a perspective view of the carrier component of the expander-side labyrinth seal.
Figure 21:
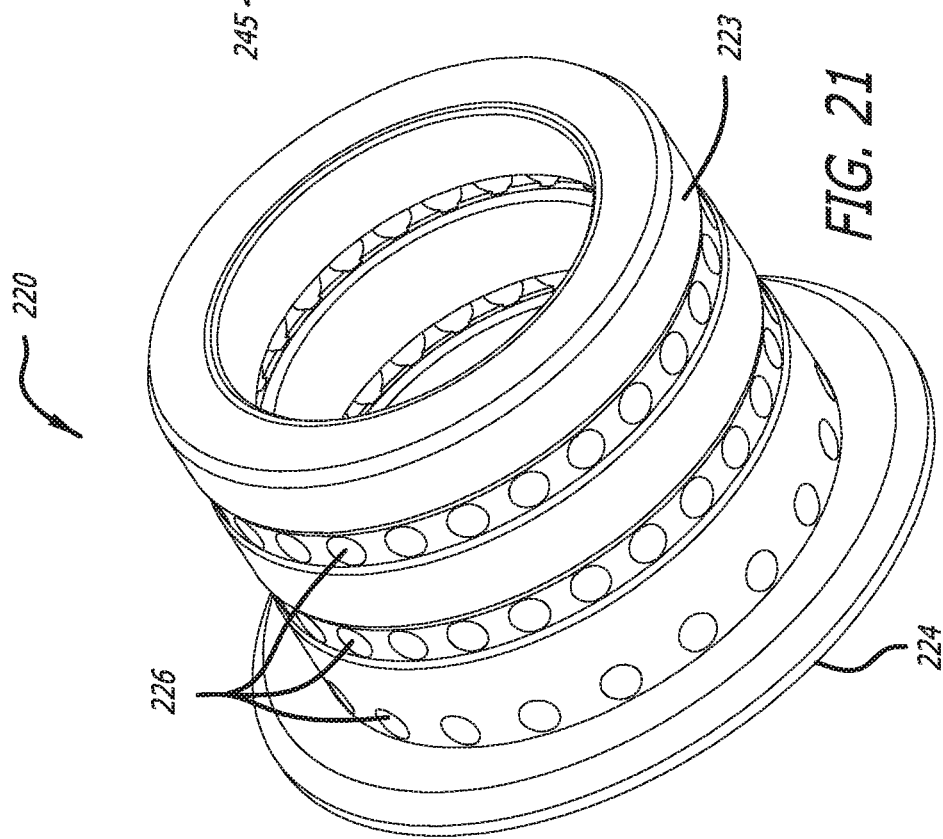
FIG. 21 is a perspective view of the runner component of the expander-side labyrinth seal of the present application.

FIG. 20 is an exploded sectional view of the runner 220 and carrier 222 components of the expander-side labyrinth seal 200 of FIG. 19, FIG. 20A is an enlarged view of a portion of the runner, and FIGS. 21 and 22 are perspective views of these components. As mentioned, the runner 220 has a generally tubular portion 223 with a radial flange 224 on one end. The runner 220 is perforated with a series of rows of radially-oriented through holes 226. More particularly, there are three rows of radially-oriented through holes 226, each row extending circumferentially around the body of the runner 220 in an evenly-spaced manner. In one embodiment, there are 24 evenly-spaced through holes 226 in each row, though the number may be more or less as desired. As will be explained, the through holes 226 permit any gas that escapes around the shaft 102 to pass therethrough into the pressure reduction cavities defined by the surrounding carrier 222.

The runner 220 is desirably machined out of brass and includes an inner recessed surface 230 that engages a series of inner babbitt lands 232. The babbitt lands 232 directly surround the teeth 212 on the shaft 102 and provide a wear buffer. More particularly, the babbitt lands 232 are desirably made of a soft metal such as lead characterized by its resistance to galling. Again, it should be understood that the babbitt lands 232 are desirably formed of a single homogenous tubular sleeve having portions machined away to avoid interfering with the through holes 226.

FIG. 20 is a partial sectional view through the carrier 222 comprising the four axially-stacked and bonded discs. In particular, from right to left, there is a first disc 240a, a second disc 240b, a third disc 240c, and a fourth disc 240d. The four discs form a sandwiched assembly 242 as seen in FIG. 22 having a central through bore 244 that receives the tubular portion 223 of the runner 220, with the radial flange 224 engaging an annular step 245 at the left end of the through bore, as best seen in FIG. 19.

The sectional view in FIG. 20 is taken along the vertical through the center of the assembly 242 as seen in FIG. 23B. Each of the second, third, and fourth discs 240b, 240c, 240d have channels cut into their right faces, as best seen in FIGS. 24-28, which intersect with the central through bore 244. Three inner openings 246b, 246c, 246d are shown, respectively, in FIG. 20 at the inner annulus of each of the three discs 240b, 240c, 240d opening to the central through bore 244. As will be clear below, however, each of these three discs 240b, 240c, 240d has channels which form four of the inner openings 246b, 246c, 246d to the through bore 244 at 90° apart; namely, horizontal left and right and vertical up and down.

With reference back to FIG. 19, which is a vertical sectional view through the expander-side labyrinth seal 200, upper and lower ones of the four inner openings 246b, 246c, 246d in each of the respective discs are shown aligned with through holes 226 in the runner 220. In this manner, the inner openings 246b, 246c, 246d are placed in fluid communication with the exterior of the shaft 102.

Figure 24:
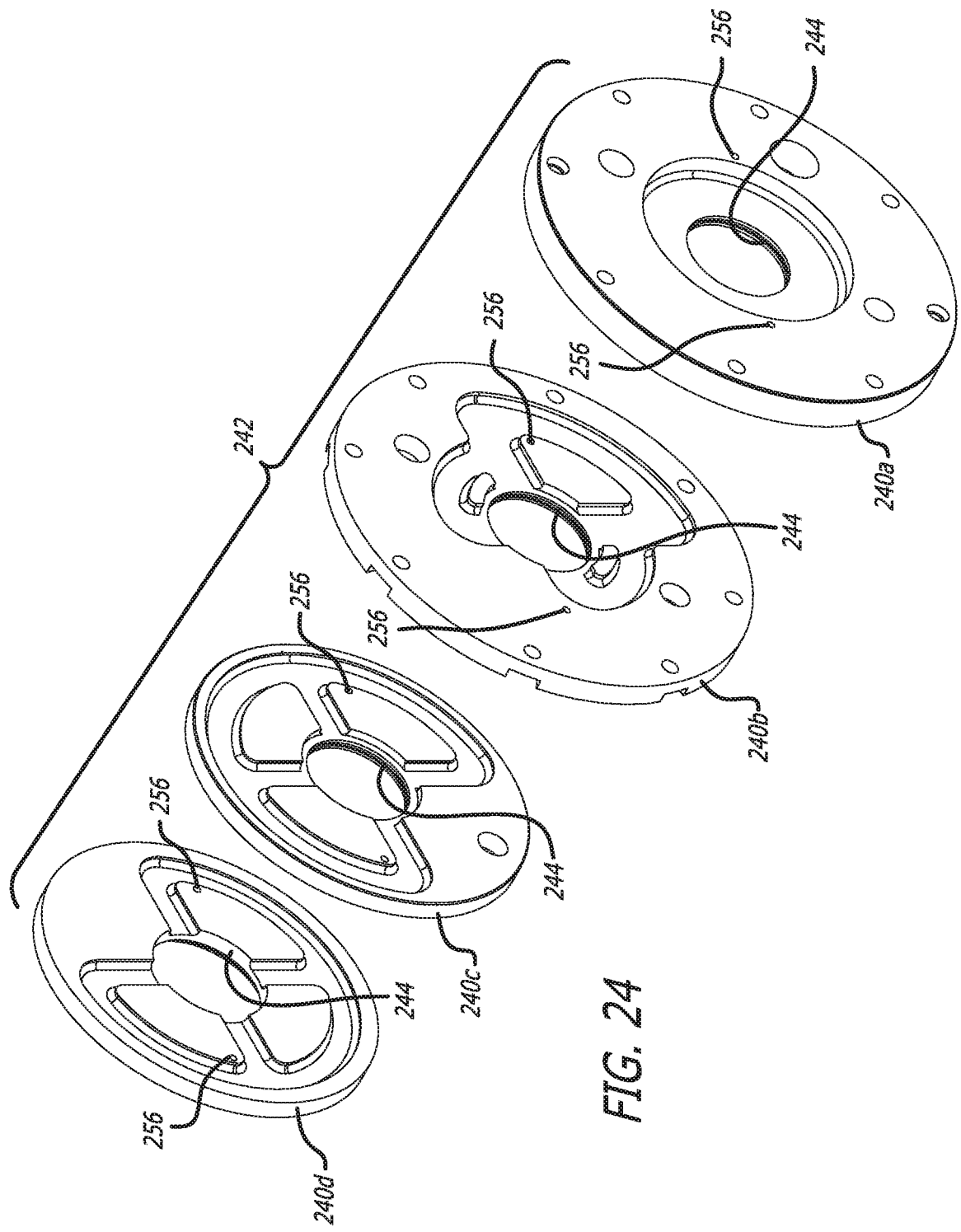
FIG. 24 is a perspective exploded view of a plurality of finished discs used to form the carrier component of the expander-side labyrinth seal.

To better see the channeled flow through the labyrinth seal 200 on the expander side which reduces gas loss, a clear understanding is necessary of the shape of the discs in the sandwiched assembly 242 that makes up the carrier 222. FIG. 24 is a perspective exploded view of a plurality of finished discs used to form the carrier component to 22 of the expander-side labyrinth seal 200. Again, the discs are numbered right to left as a first disc 240a, a second disc 240b, a third disc 240c, and a fourth disc 240d. Although not shown, thin resin discs as described above for the compressor side discs are desirably interposed in the spaces between the four discs and utilized to bond the discs together. That is, the carrier discs 240a, 240b, 240c, 240d are desirably formed of a glass epoxy laminate material (e.g., NEMA FR4) in circular plates, then milled for internal passages, epoxy and pressure bonded, and again milled for flow passages.

Each of the carrier discs 240a, 240b, 240c, 240d has the central through bore 244 machined therein, as well as diametrically opposed alignment holes 256. Alignment pins (not shown) pass through the alignment holes 256 prior to bonding to ensure that the discs are properly rotationally aligned.

Figure 29:
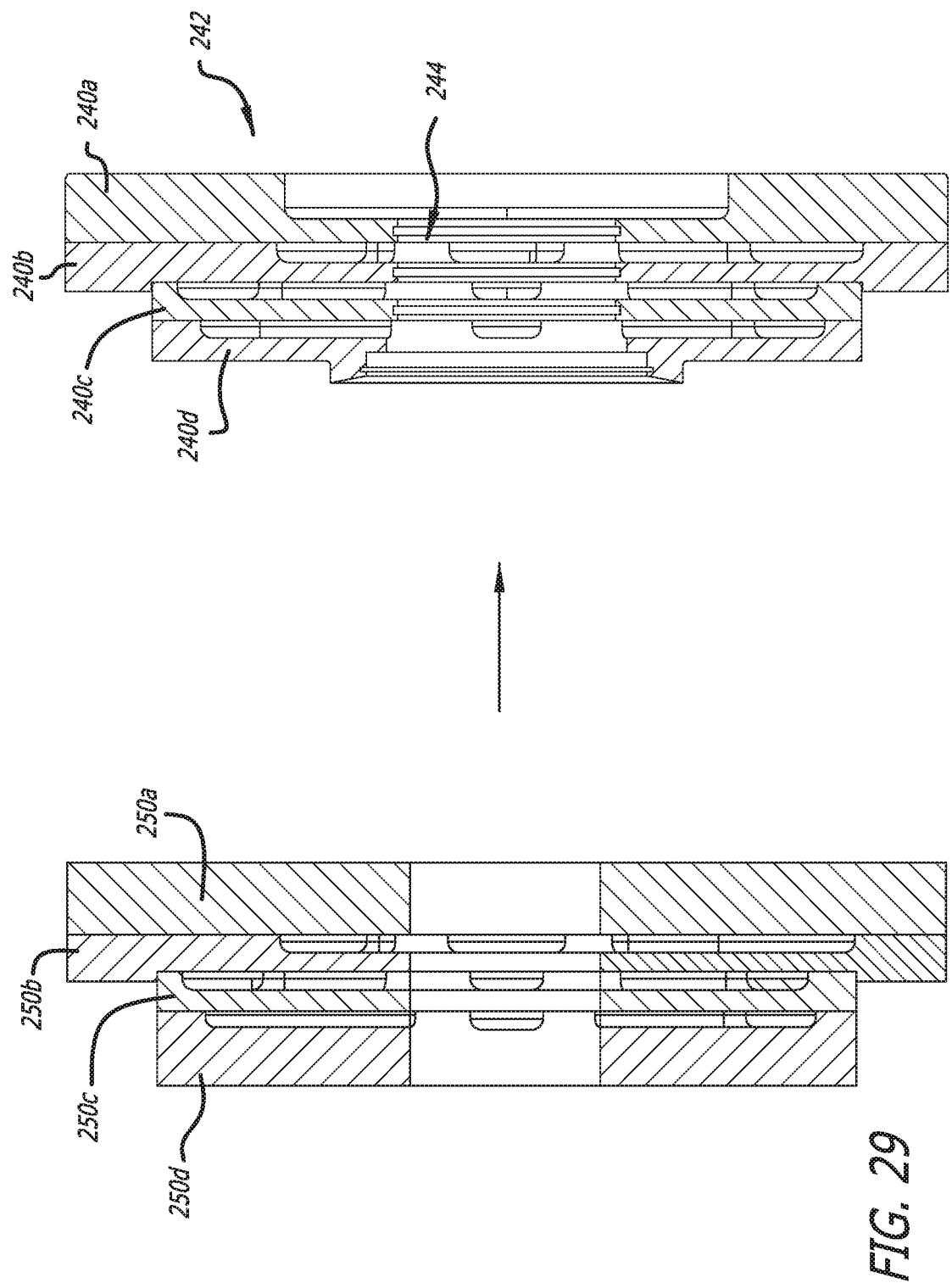
FIG. 29 is a juxtaposition of sectional views through the sandwiched discs that form the carrier component of the expander-side labyrinth seal both before and after machining.

FIG. 29 schematically shows the change in shape between sandwiched unfinished discs 250a, 250b, 250c, 250d to the disc assembly 242 that makes up the carrier 222. Following bonding of the unfinished discs 250a, 250b, 250c, 250d together, the central through bore 244 as well as several exterior steps are machined to create the finished product.

FIGS. 25-28 are elevational views of the four finished discs 240a, 240b, 240c, 240d showing the channels mentioned above machined in the right face of three of the discs, as well as several other flow ports. For the sake of understanding, each of the discs 240a, 240b, 240c, 240d shown in elevational view in FIGS. 25-28 with an angular reference system having 0° up (12:00 o'clock) and 180° down (6:00 o'clock). Various channels in the discs exist in discrete quadrants defined by this reference system, with a first quadrant being located clockwise from 0° (i.e., 0-90°) and so on. This orientation is preferably how the discs are assembled into the larger turboexpander, though the final orientation relative to the overall system may be altered.

The first disc 240a has a first exit port 260 positioned between the center and outer edge of the disc and rotationally oriented at approximately 225° (7:30 o'clock). A second exit port 262 through the first disc 240a is also positioned between the center and outer edge of the disc and rotationally oriented at approximately 45° (1:30 o'clock). As will be explained, the exit ports 260, 262 channel the gases captured as they pass through the labyrinth seal 200 so that these gases may be re-pressurized and reused. A third exit port 263 in the second quadrant of the first disc 240a provides an egress for low pressure gas that passes through the seal 200 and vents to the atmosphere. These exit ports 260, 262, 263 are also shown in the finished carrier 222 in FIG. 23C.

The second disc 240b defines a channel 264 in the right face that surrounds and opens to the central through bore 244 and has connecting passages leading to an arcuate passage 266 only in the second quadrant with a curvature centered at the center of the disc. The arcuate passage 266 is located approximately midway between the central through bore 244 and outer edge of the disc 240b, and thus aligns with the third exit port 263 in the first disc 240a.

After the assembly of discs has been machined into the final carrier 222, as seen in FIG. 29, the central through bore 244 is an enlarged to the contours of the through bore 244 which intersects with the channel 264 to form the four inner openings 246b, as seen in FIG. 20. Gas that has leaked around the shaft 102 and reaches the second disc 240b passes outward through the openings 246b and into the channel 264. The gas eventually reaches the arcuate passage 266 and is thus in communication with the third exit port 263 in the first disc 240a. This is the lowest pressure gas that leaks around the shaft 102, and the exit port 263 thus vents into an ambient atmosphere. For example, with regard to the system shown in FIG. 1, the low-pressure gas eventually finds its way into the chamber 23 formed within the central bearing housing 15.

The second disc 240b also has a first shunt port 268 extending axially therethrough aligned with the second exit port 262 in the first disc 240a. Furthermore, the second disc 240b has a second shunt port 270 extending axially therethrough and aligned with the first exit port 260 in the first disc 240a.

The third disc 240c defines a channel 274 which has four radial fingers 276 opening to the central through bore 244. Again, once the carrier 222 has been machined, the larger through bore 244 connects with the fingers 276 to form the four inner openings 246c, seen in FIG. 20. The channel 274 further includes an arcuate passage 278 that extends approximately 270° around the center of the disc in the first, second and fourth quadrants. Mid-pressure gas that leaks around the shaft 102 and finds its way to the inner openings 246c passes outward into the arcuate passage 278 which is in fluid communication with the shunt port 268 extending axially through the second disc 240b. The shunt port 268 is also aligned with the second exit port 262 in the first disc 240a, so that mid-pressure gas is sent to the left face of the carrier 222. Again, this gas can be recaptured, re-pressurized and thus reused.

The third disc 240c further includes a shunt port 279 adjacent to the outer edge and extending axially through the disc. The shunt port 279 is at approximately 225° (7:30 o'clock) and aligns with the second shunt port 270 in the second disc 240b and the first exit port 260 in the first disc 240a, as will be explained below.

Finally, in the fourth disc 240d, a channel 280 in its right face again has four radial fingers 282 extending inward toward the central through bore 244, which form the inner openings 246d to a single arcuate passage 286 approximately 270° around the center of the disc in the second, third and fourth quadrants. The single arcuate passage 286 align with the shunt port 279 in the third disc 240c. High-pressure gas which initially leaks around the shaft 102 and reaches the inner openings 246d passes outward into the channel 280 and eventually to the shunt ports 279, 270, and then to the first exit port 260 in the first disc 240a, so that high-pressure gas is sent to the right face of the carrier 222. Again, this gas can be recaptured, re-pressurized and thus reused.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A turboexpander having a labyrinth seal for reducing gas losses around a rotating shaft, comprising:
   a rotating shaft defining a longitudinal axis of rotation and having a series of external teeth thereon along an axial segment;
   a compressor wheel fixed to a first end of the shaft;
   a bearing housing having bearings that supports the shaft, the axial segment having teeth being located between the bearings and compressor wheel; and
   a stationary labyrinth seal surrounding the axial segment of the shaft having teeth, the labyrinth seal having an inner lumen in contact with the teeth and having a plurality of sets of inner openings in fluid communication with the axial segment, each set of inner openings surrounding the shaft at a particular axial position, wherein the sets of openings extend in series from a first set of inner openings at a high pressure end of the axial segment adjacent the compressor wheel to a last set of inner openings at a low pressure end of the axial segment adjacent the bearings, each set of inner openings leading to a flow channel common to those inner openings, and each flow channel being ported to a location separate from the other flow channels, wherein
   high pressure gas at the high pressure end of the axial segment that leaks between the inner lumen of the labyrinth seal and the teeth reaches the first set of inner openings whereby the high pressure gas is ported to a first recovery location, and medium pressure gas that leaks between the inner lumen of the labyrinth seal and the teeth to reach a second set of inner openings in series with the first set of inner openings is ported to a second recovery location, with the process continuing to the last set of inner openings whereby low pressure gas is ported to the atmosphere.

2. The turboexpander of claim 1, wherein the labyrinth seal comprises a sleeve-like runner surrounding and defining the inner lumen in contact with the shaft, the runner having a plurality of through holes around a circumference of the runner arranged in a plurality of axially-spaced rows, wherein each row of through holes is in fluid communication with one of the sets of inner openings.

3. The turboexpander of claim 2, wherein a carrier comprises a plurality of axially stacked annular discs bonded together to define a central through bore within which is received the runner, wherein one or more discs have grooves formed in one face thereof that form the flow channel in that disc and intersect the central through bore to form the set of inner openings in that disc.

4. The turboexpander of claim 3, wherein some of the carrier discs have axial shunt ports formed therein which route gas from at least one of the flow channels in one disc through an axial shunt port to an exit port in an end disc.

5. The turboexpander of claim 3, wherein there are exactly four of the carrier discs with three of the discs having inner openings such that gas that leaks between the inner lumen of the labyrinth seal and the teeth is removed and recovered in three stages with progressively reducing pressures.

6. The turboexpander of claim 3, wherein the carrier discs are made of an aluminum alloy.

7. The turboexpander of claim 6, wherein the runner is made of brass and has a series of babbitt lands in contact with an inner lumen thereof, the babbitt lands being formed of a soft metal that directly contacts and reduces friction with the teeth, wherein one of the babbitt lands is positioned between each two adjacent rows of through holes in the runner.

8. The turboexpander of claim 2, wherein the runner is made of brass and has a series of babbitt lands in contact with an inner lumen thereof, the babbitt lands being formed of a soft metal that directly contacts and reduces friction with the teeth, wherein one of the babbitt lands is positioned between each two adjacent rows of through holes in the runner.

9. The turboexpander of claim 1, wherein the turbo expander has the compressor wheel at a compressor end and an expander wheel at an expander end, and wherein there are two of the labyrinth seals provided around the shaft, one at the compressor end and one at the expander end.

10. The turboexpander of claim 9, wherein the expander end has an expander wheel fixed to a second end of the shaft and second bearings in the bearing housing, with a second set of teeth in a second axial segment between the second bearings and expander wheel, with a second labyrinth seal being arranged around the shaft second axial segment, and wherein both labyrinth seals include porting that directs low pressure gas to the bearing housing which is open to the atmosphere.

11. The turboexpander of claim 10, wherein the second labyrinth seal comprises a plurality of axially stacked annular discs bonded together to define a central through bore within which is received a sleeve-like runner surrounding and defining the inner lumen in contact with the shaft, the runner having a plurality of through holes around a circumference of the runner arranged in a plurality of axially-spaced rows, wherein each row of through holes is in fluid communication with one of the sets of inner openings, wherein one or more discs have grooves formed in one face thereof that form the flow channel in that disc and intersect the central through bore to form the set of inner openings in that disc.

12. The turboexpander of claim 11, wherein a carrier comprises a plurality of axially stacked annular discs bonded together to define a central through bore within which is received the runner, wherein one or more discs have grooves formed in one face thereof that form the flow channel in that disc and intersect the central through bore to form the set of inner openings in that disc, and wherein some of the carrier discs in the second labyrinth seal have axial shunt ports formed therein which route gas from at least one of the flow channels in one disc through an axial shunt port to an exit port in an end disc.

13. The turboexpander of claim 11, wherein there are exactly four of the carrier discs in the second labyrinth seal with three of the discs having inner openings such that gas that leaks between the inner lumen of the second labyrinth seal and the teeth in the second axial segment is removed and recovered in three stages with progressively reducing pressures.

14. The turboexpander of claim 11, wherein the carrier discs in the second labyrinth seal are made of a glass epoxy laminate.

15. The turboexpander of claim 14, wherein the runner in the second labyrinth seal is made of brass and has a series of babbitt lands in contact with an inner lumen thereof, the babbitt lands being formed of a soft metal that directly contacts and reduces friction with the teeth in the second axial segment, wherein one of the babbitt lands is positioned between each two adjacent rows of through holes in the runner.

* * * * *